(12) United States Patent
Masunishi et al.

(10) Patent No.: US 12,529,561 B2
(45) Date of Patent: Jan. 20, 2026

(54) SENSOR AND ELECTRONIC DEVICE

(71) Applicant: KABUSHIKI KAISHA TOSHIBA, Tokyo (JP)

(72) Inventors: Kei Masunishi, Kawasaki Kanagawa (JP); Etsuji Ogawa, Kawasaki Kanagawa (JP); Yasushi Tomizawa, Toyko (JP); Fumito Miyazaki, Yokohama Kanagawa (JP); Daiki Ono, Yokohama Kannagawa (JP); Kengo Uchida, Kawasaki Kanagawa (JP); Hiroki Hiraga, Saitama (JP); Shiori Kaji, Kawasaki Kanagawa (JP); Hideaki Murase, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 328 days.

(21) Appl. No.: 18/174,551

(22) Filed: Feb. 24, 2023

(65) Prior Publication Data
US 2024/0085181 A1   Mar. 14, 2024

(30) Foreign Application Priority Data

Sep. 14, 2022 (JP) .................................. 2022-146097
Jan. 16, 2023 (JP) .................................. 2023-004635

(51) Int. Cl.
*G01C 19/5656* (2012.01)
*G01C 19/5663* (2012.01)

(52) U.S. Cl.
CPC ..... *G01C 19/5656* (2013.01); *G01C 19/5663* (2013.01)

(58) Field of Classification Search
None
See application file for complete search history.

(56) References Cited

U.S. PATENT DOCUMENTS

| | | | |
|---|---|---|---|
| 10,566,258 B2 | 2/2020 | Muto et al. | |
| 10,585,111 B2 * | 3/2020 | Zhang | B81B 3/0051 |
| 10,866,258 B2 | 12/2020 | Reinke | |
| 11,307,217 B1 * | 4/2022 | Senkal | G01P 15/13 |
| 11,933,810 B2 * | 3/2024 | Zega | G01P 15/0802 |
| 2010/0300204 A1 * | 12/2010 | Reinmuth | G01P 15/125 |
| | | | 73/514.32 |
| 2012/0286886 A1 * | 11/2012 | Kim | H03H 9/2426 |
| | | | 331/107 DP |
| 2015/0059477 A1 * | 3/2015 | Kim | G01P 15/18 |
| | | | 73/514.33 |

(Continued)

OTHER PUBLICATIONS

Guillermo Sobreiviela-Falces et al., "A Navigation-Grade Mems Vibrating Beam Accelerometer," IEEE MEMS 2022, Tokyo, Japan, pp. 782-785, (Jan. 9-13, 2022).

*Primary Examiner* — Mark A Shabman
(74) *Attorney, Agent, or Firm* — Finnegan, Henderson, Farabow, Garrett & Dunner, LLP

(57) ABSTRACT

According to one embodiment, a sensor includes a base, a first support portion fixed to the substrate, and a first member supported by the first support portion. A gap is provided between the base and the first member. The first beam electrode and the second beam electrode satisfy at least one of a first condition, a second condition, a third condition, a fourth condition, a fifth condition, a sixth condition, a seventh condition, or an eighth condition.

17 Claims, 19 Drawing Sheets

(56) References Cited

U.S. PATENT DOCUMENTS

| | | | |
|---|---|---|---|
| 2015/0226762 A1* | 8/2015 | Seshia | G01K 11/26 |
| | | | 73/495 |
| 2015/0355218 A1* | 12/2015 | Jeong | G01C 19/5747 |
| | | | 73/504.12 |
| 2018/0238688 A1* | 8/2018 | Kikuchi | G01P 15/097 |
| 2020/0025790 A1* | 1/2020 | Reinke | G01P 15/032 |
| 2020/0358422 A1* | 11/2020 | Northcutt | H03H 9/10 |

\* cited by examiner

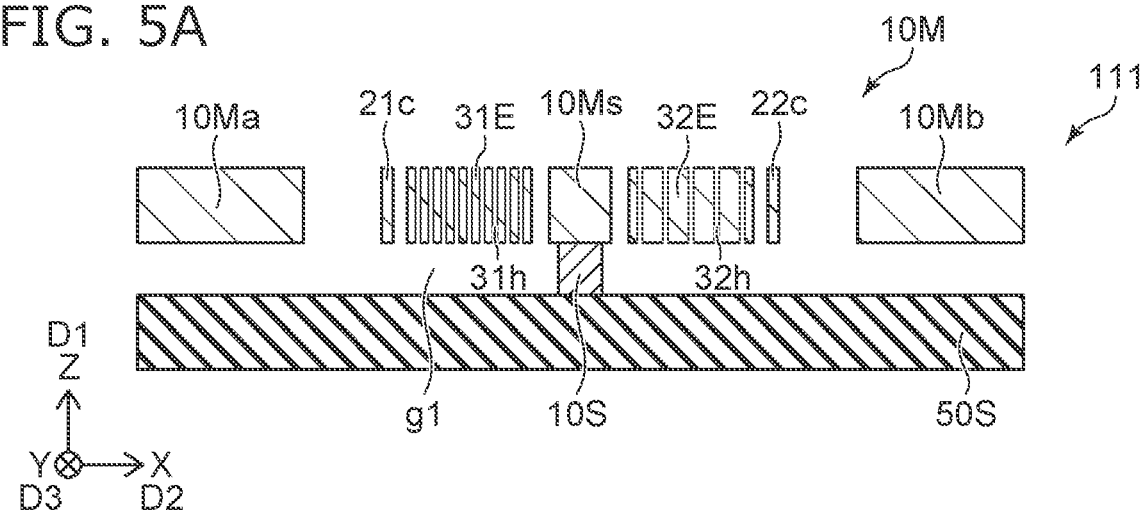
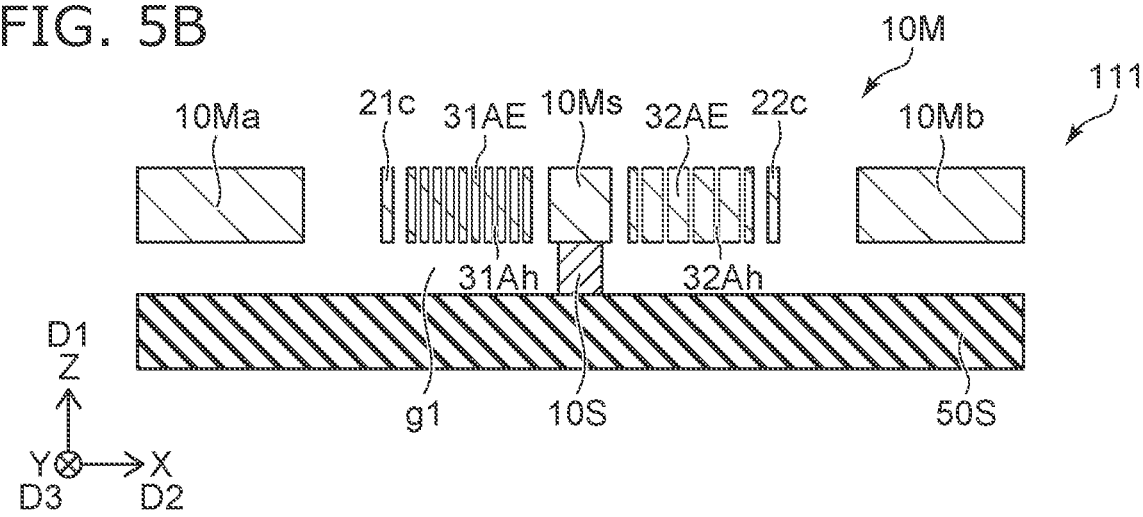

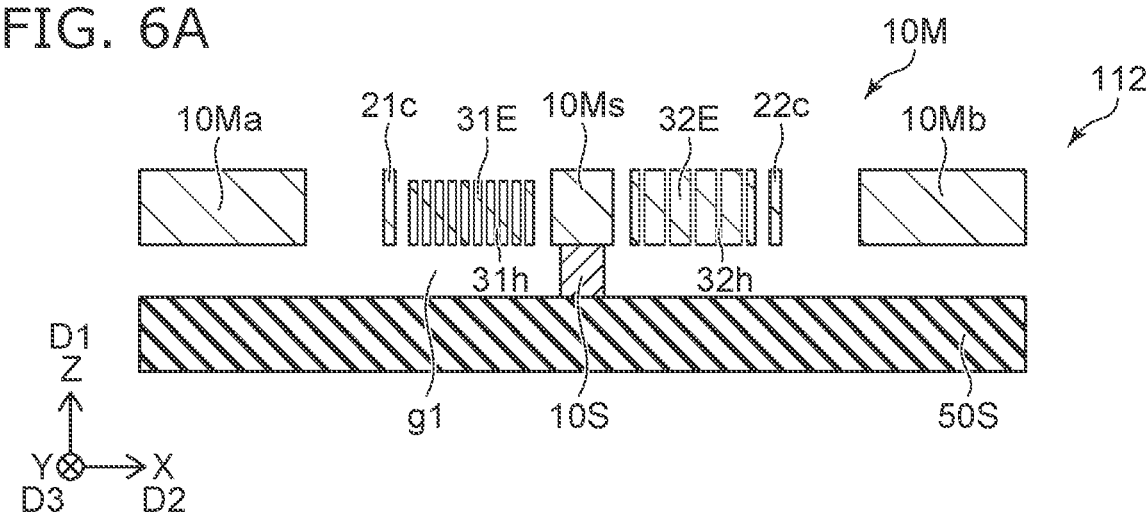
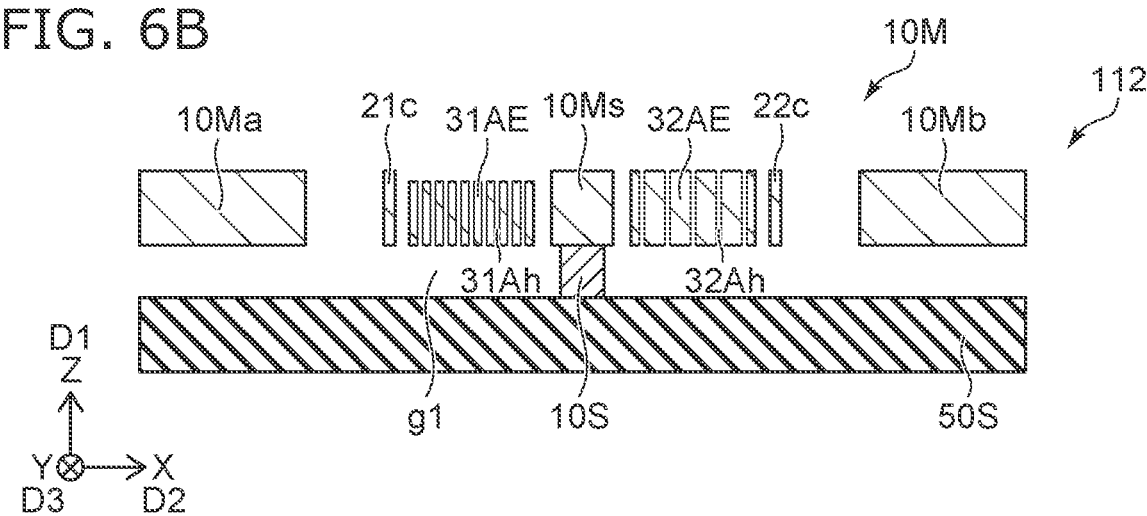

SENSOR AND ELECTRONIC DEVICE

CROSS-REFERENCE TO RELATED APPLICATIONS

This application is based upon and claims the benefit of priority from Japanese Patent Application No. 2022-146097, filed on Sep. 14, 2022, and Japanese Patent Application No. 2023-004635, filed on Jan. 16, 2023; the entire contents of which are incorporated herein by reference.

FIELD

Embodiments described herein relate generally to a sensor and an electronic device.

BACKGROUND

For example, there is a sensor using a MEMS structure. It is desired to improve the characteristics of the sensor.

BRIEF DESCRIPTION OF THE DRAWINGS

FIG. 5A and FIG. 5B are schematic cross-sectional views illustrating parts of a sensor according to the first embodiment;

FIG. 6A and FIG. 6B are schematic cross-sectional views illustrating parts of a sensor according to the first embodiment;

DETAILED DESCRIPTION

Figure 1:
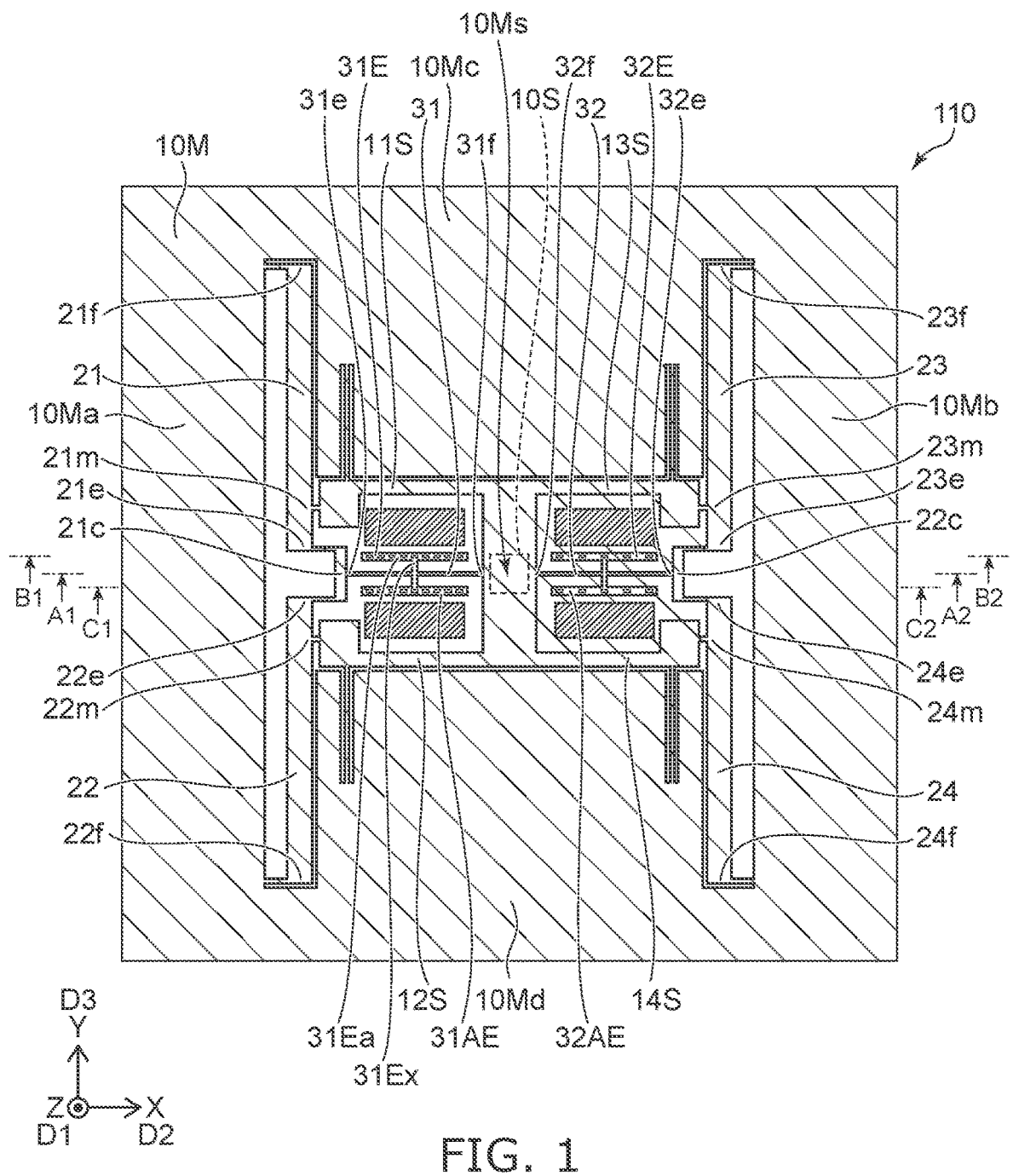
FIG. 1 is a schematic plan view illustrating a sensor according to a first embodiment.

According to one embodiment, a sensor includes a base, a first support portion fixed to the substrate, and a first member supported by the first support portion. A gap is provided between the base and the first member. The first member includes a first support region, a first connection structure, a second connection structure, a first beam, a second beam, a first beam electrode, and a second beam electrode. The first support portion is provided between the base and the first support region in a first direction from the base to the first support portion. The first support region is supported by the first support portion. The first beam and the second beam extend along a second direction crossing the first direction. A direction from the first connection structure to the second connection structure is along the second direction. The first support region is provided between the first connection structure and the second connection structure in the second direction. The first beam includes a first end and a first other end. The first end is connected to the first connection structure. The first other end is connected to the first support region. The second beam includes a second end and a second end. The second end is connected to the second connection structure. The second end is connected to the first support region. The first beam electrode is connected to the first beam. A third direction from the first beam to the first beam electrode crosses a plane including the first direction and the second direction. The second beam electrode is connected to the second beam. A direction from the second beam to the second beam electrode is along the third direction. The first beam electrode and the second beam electrode satisfy at least one of a first condition, a second condition, a third condition, a fourth condition, a fifth condition, a sixth condition, a seventh condition, or an eighth condition. In the first condition, a second mass of the second beam electrode is different from a first mass of the first beam electrode. In the second condition, a second thickness along the first direction of the second beam electrode is different from a first thickness along the first direction of the first beam electrode. In the third condition, at least a part of the second material included in the second beam electrode is different from at least a part of the first material included in the first beam electrode. In the fourth condition, a second size of a second hole included in the second beam electrode is different from a first size of a first hole included in the first beam electrode. In the fifth condition, a second density of the second hole is different from a first density of the first hole. In the sixth condition, a second number of the second holes is different from a first number of the first holes. In the seventh condition, a second shape of the second hole is different from a first shape of the first hole. In the eighth condition, a second layer configuration of the second beam electrode is different from a first layer configuration of the first beam electrode.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a sensor according to a first embodiment.

Figure 2:
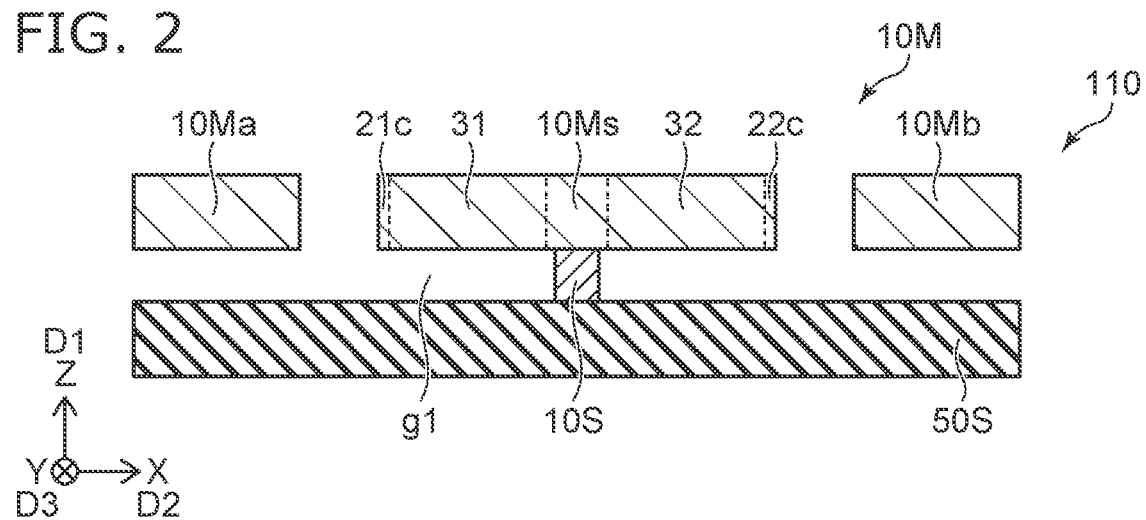
FIG. 2 is a schematic cross-sectional view illustrating the sensor according to the first embodiment.

FIG. 2 is a schematic cross-sectional view illustrating the sensor according to the first embodiment.

FIG. 2 is a cross-sectional view taken along the line A1-A2 of FIG. 1.

As shown in FIG. 1 and FIG. 2, a sensor 110 according to the embodiment includes a base 50S, a first support portion 10S and a first member 10M.

As shown in FIG. 2, the first support portion 10S is fixed to the base 50S. The first member 10M is supported by the first support portion 10S. A gap g1 is provided between the base 50S and the first member 10M. At least part of the first member 10M may be conductive.

A first direction D1 from the base 50S to the first support portion 10S is defined as a Z-axis direction. One direction perpendicular to the Z-axis direction is defined as the X-axis direction. A direction perpendicular to the Z-axis direction and the X-axis direction is defined as the Y-axis direction.

As shown in FIG. 1, the first member 10M includes a first support region 10Ms, a first movable region 10Ma, a second movable region 10Mb, a first connection structure 21c, a second connection structure 22c, a first beam 31, a second beam 32, a first beam electrode 31E, and a second beam electrode 32E.

As shown in FIG. 2, the first support portion 10S is provided between the base 50S and the first support region 10Ms in the first direction D1.

As shown in FIG. 1, the first beam 31 and the second beam 32 extend along a second direction D2. The second direction D2 crosses the first direction D1. The second direction D2 is, for example, the X-axis direction.

In the second direction D2, the first support region 10Ms is provided between the first movable region 10Ma and the second movable region 10Mb.

The first connection structure 21c is supported by the first movable region 10Ma. The first connection structure 21c is provided between the first movable region 10Ma and the first support region 10Ms in the second direction D2.

The first beam 31 includes a first end 31e and a first other end 31f. The first end 31e is connected to the first connection structure 21c. The first other end 31f is connected to the first support region 10Ms.

The second connection structure 22c is supported by the second movable region 10Mb. The second connection structure 22c is provided between the first support region 10Ms and the second movable region 10Mb in the second direction D2.

The second beam 32 includes a second end 32e and a second other end 32f. The second end 32e is connected to the second connection structure 22c. The second other end 32f is connected to the first support region 10Ms.

The first beam electrode 31E is connected to the first beam 31. A third direction D3 from the first beam 31 to the first beam electrode 31E crosses a plane including the first direction D1 and the second direction D2.

The second beam electrode 32E is connected to the second beam 32. The direction from the second beam 32 to the second beam electrode 32E is along the third direction D3.

In embodiments, the second beam electrode 32E is asymmetric with respect to the first beam electrode 31E. For example, at least one of mass, thickness, shape, layer configuration, material, and holes is different between the first beam electrode 31E and the second beam electrode 32E. Thereby, for example, a difference in resonance frequency occurs between the first beam 31 and the second beam 32. This increases the dynamic range of the detection. A sensor capable of improving characteristics can be provided.

Figure 3:
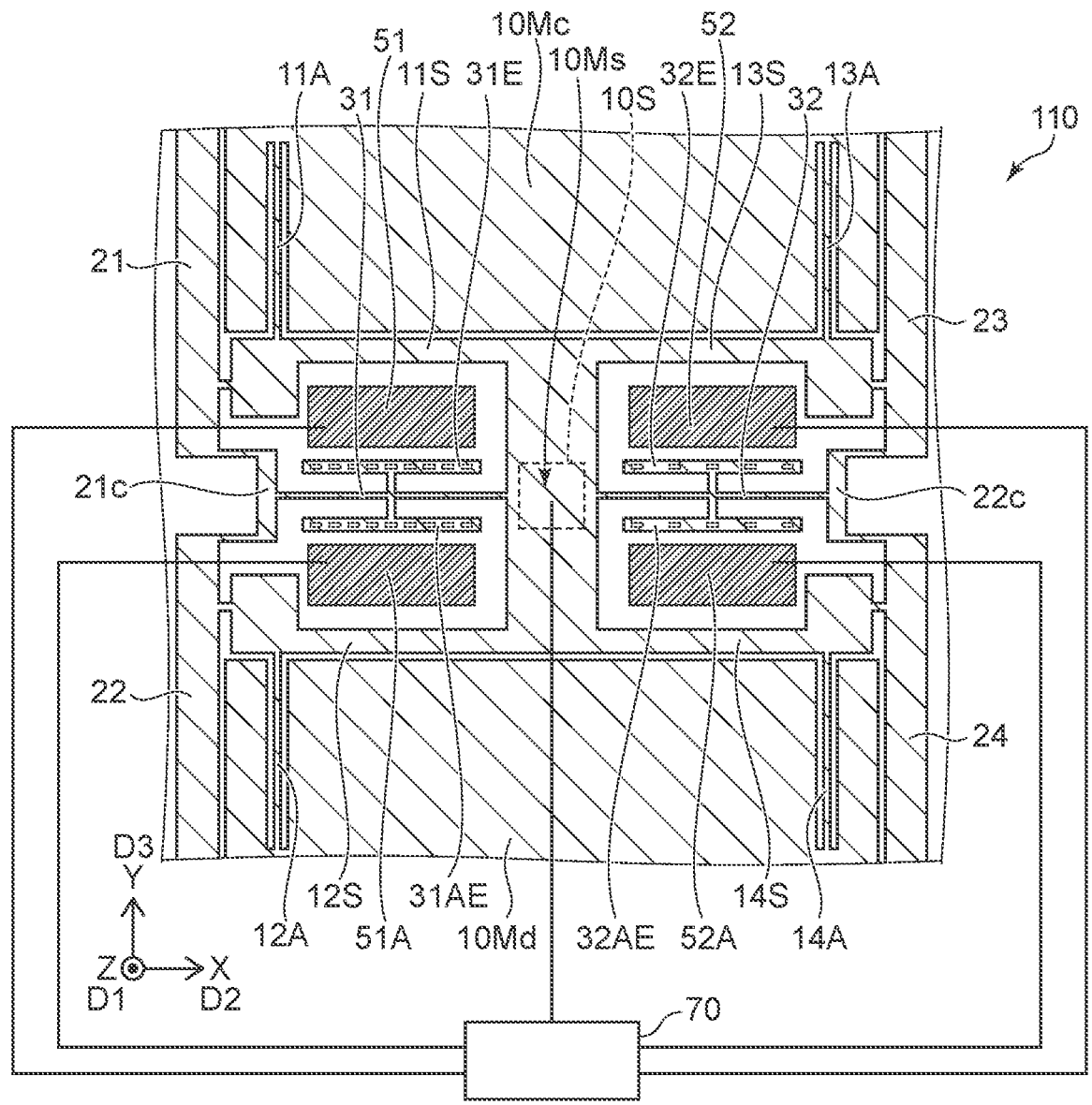
FIG. 3 is a schematic plan view illustrating a part of the sensor according to the first embodiment.

FIG. 3 is a schematic plan view illustrating a part of the sensor according to the first embodiment.

A part of FIG. 1 is shown enlarged in FIG. 3.

As shown in FIG. 3, the sensor 110 may include a first electrode 51 and a second electrode 52. The first electrode 51 and the second electrode 52 are fixed to the base 50S.

As described above, the first member 10M includes the first beam electrode 31E and the second beam electrode 32E. The first electrode 51 faces the first beam electrode 31E. The second electrode 52 faces the second beam electrode 32E.

As shown in FIG. 3, a controller 70 may be provided. The controller 70 may be included in the sensor 110. The controller 70 may be provided separately from the sensor 110.

The controller 70 is electrically connected to the first electrode 51, the second electrode 52, the first beam electrode 31E and the second beam electrode 32E. For example, the first beam electrode 31E and the second beam electrode 32E are electrically connected to, for example, the first support region 10Ms of the first member 10M.

The controller 70 is configured to apply a drive signal including an AC component between the first electrode 51 and the first beam electrode 31E. The controller 70 is configured to apply the drive signal including the AC component between the second electrode 52 and the second beam electrode 32E. The first beam 31 can vibrate according to the drive signal. The second beam 32 can vibrate according to the drive signal.

For example, when force (acceleration) is applied to the first member 10M from the outside, the first member 10M can be displaced along the second direction D2. For example, the first movable region 10Ma and the second movable region 10Mb are displaced along the second direction D2. The displacement is transmitted to the first connection structure 21c and the second connection structure 22c. Thereby, the first connection structure 21c and the second connection structure 22c are displaced along the second direction D2. Compressive stress or tensile stress is applied to the first beam 31 and the second beam 32 based on this displacement. The stress changes the resonance frequency of the first beam 31 and the resonance frequency of the second beam 32. The magnitude of change in resonance frequency is opposite between the first beam 31 and the second beam 32. By detecting the difference between the resonance frequency of the first beam 31 and the resonance frequency of the second beam 32, externally applied force (acceleration) can be detected with high accuracy.

As described above, in the embodiment, the first beam electrode 31E and the second beam electrode 32E are asymmetrical with each other. This causes a difference in resonance frequency between the first beam 31 and the second beam 32. This increases the dynamic range of detection.

The difference in resonance frequencies between the first beam 31 and the second beam 32 may be detected by any method. For example, an optical technique may be used to detect the difference in resonance frequencies. For example, an electrical method may be used to detect the difference in resonant frequencies. An example of a configuration in which the difference in resonance frequencies is detected by an electrical method will be described below.

As shown in FIG. 3, the sensor 110 may include a first counter electrode 51A and a second counter electrode 52A. The first counter electrode 51A and the second counter electrode 52A are fixed to the base 50S. The first member 10M may include a first counter beam electrode 31AE and a second counter beam electrode 32AE. The first counter beam electrode 31AE is connected to the first beam 31. In the third direction D3, the first beam 31 is provided between the first counter beam electrode 31AE and the first beam electrode 31E. The second counter beam electrode 32AE is connected to the second beam 32. In the third direction D3, the second beam 32 is provided between the second counter beam electrode 32AE and the second beam electrode 32E.

The first electrode 51 faces the first beam electrode 31E. The first counter electrode 51A faces the first counter beam electrode 31AE. The second electrode 52 faces the second beam electrode 32E. The second counter electrode 52A faces the second counter beam electrode 32AE.

As shown in FIG. 3, the controller 70 is configured to apply the drive signal including the AC component between the first electrode 51 and the first beam electrode 31E. The controller 70 is configured to detect an electrical signal generated between the first counter electrode 51A and the first counter beam electrode 31AE. The controller 70 is configured to apply the drive signal including the AC component between the second electrode 52 and the second beam electrode 32E. The controller 70 is configured to detect the electrical signal generated between the second counter electrode 52A and the second counter beam electrode 32AE.

By detecting the electrical signal generated between the first counter electrode 51A and the first counter beam electrode 31AE and the electrical signal generated between the second counter electrode 52A and the second counter beam electrode 32AE, a difference between the resonance frequency of the first beam 31 and the resonance frequency of the second beam 32 is detected. By detecting the difference in frequencies, the force (acceleration) applied from the outside can be detected with high accuracy.

In the embodiment, the second counter beam electrode 32AE may be asymmetric with respect to the first counter beam electrode 31AE. For example, at least one of mass, thickness, shape, layer configuration, material, and hole is different between the first counter beam electrode 31AE and the second counter beam electrode 32AE. As a result, for example, the difference in resonance frequencies between the first beam 31 and the second beam 32 increases. This increases the dynamic range of detection.

Figure 4A:
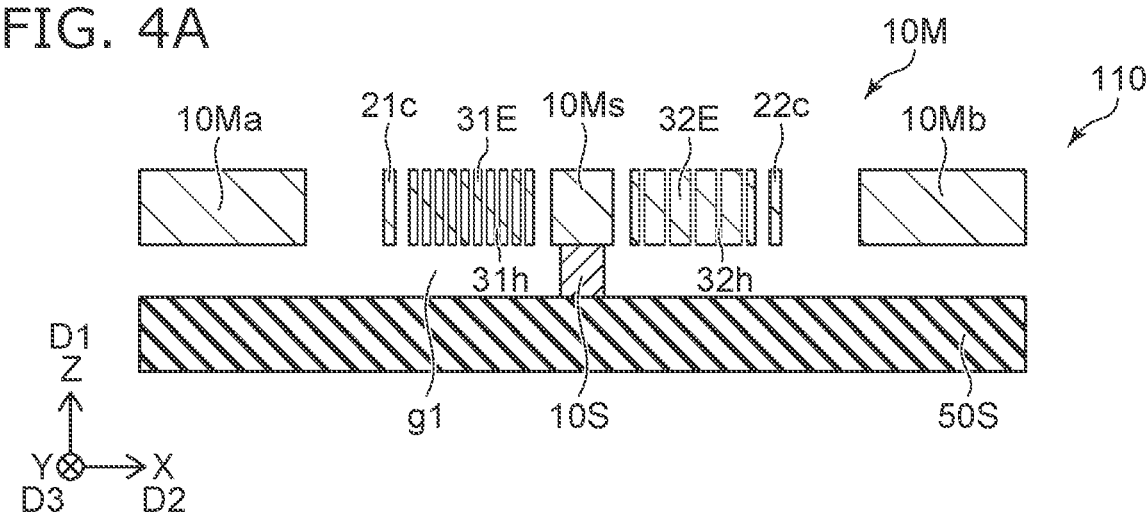
FIG. 4A and FIG. 4B are schematic cross-sectional views illustrating a part of the sensor according to the first embodiment.
Figure 4B:
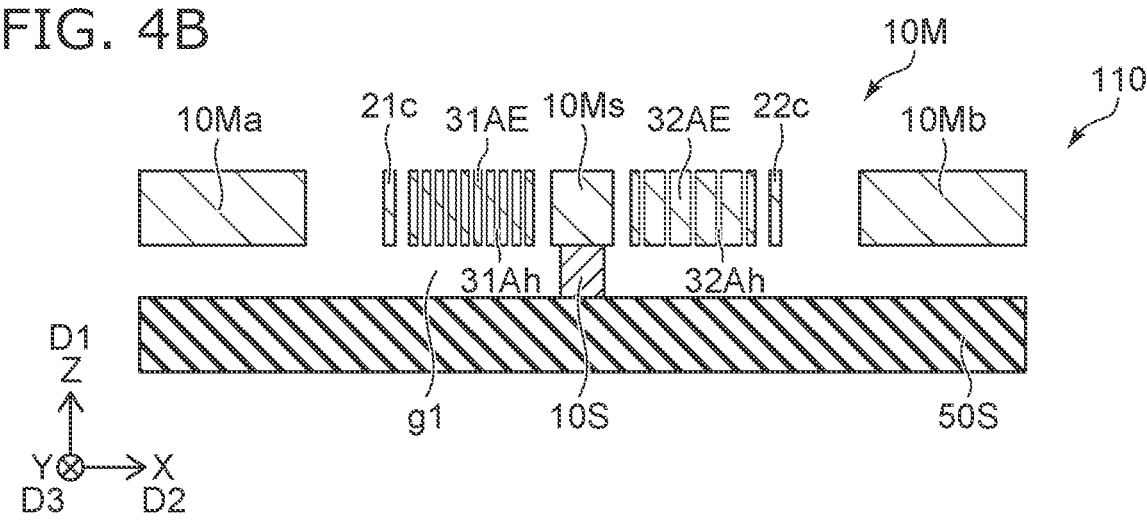

FIG. 4A and FIG. 4B are schematic cross-sectional views illustrating a part of the sensor according to the first embodiment.

FIG. 4A is a cross-sectional view taken along the line B1-B2 in FIG. 1. FIG. 4B is a cross-sectional view taken along the line C1-C2 of FIG. 1.

As shown in FIG. 4A, the first beam electrode 31E includes a first hole 31h. The second beam electrode 32E includes a second hole 32h. In this example, the number of second holes 32h is different from the number of first holes 31h. For example, the second density of the second holes 32h is different from the first density of the first holes 31h.

As shown in FIG. 4B, the first counter beam electrode 31AE includes a first counter hole 31Ah. The second counter beam electrode 32AE includes a second counter hole 32Ah. In this example, the number of second counter holes 32Ah is different from the number of first counter holes 31Ah. For example, the second counter density of the second counter holes 32Ah is different from the first counter density of the first counter holes 31Ah.

FIG. 5A and FIG. 5B are schematic cross-sectional views illustrating parts of a sensor according to the first embodiment.

FIG. 5A is a cross-sectional view corresponding to the line B1-B2 line in FIG. 1. FIG. 5B is a cross-sectional view corresponding to the line C1-C2 in FIG. 1.

As shown in FIG. 5A, in a sensor 111 according to the embodiment, the first beam electrode 31E includes the first hole 31h. The second beam electrode 32E includes the second hole 32h. In this example, the size of the second hole 32h (the length along the second direction D2 in this example) is different from the size of the first hole 31h (the length along the second direction D2 in this example). For example, the second size of the second hole 32h is different than the first size of the first hole 31h.

As shown in FIG. 5B, the first counter beam electrode 31AE includes the first counter hole 31Ah. The second counter beam electrode 32AE includes the second counter hole 32Ah. In this example, the size of the second counter hole 32Ah (in this example, the length along the second direction D2) is different from the size of the first counter hole 31Ah (in this example, the length along the second direction D2). example, the second counter size of the second counter hole 32Ah is different from the first counter size of the first counter hole 31Ah.

FIG. 6A and FIG. 6B are schematic cross-sectional views illustrating parts of a sensor according to the first embodiment.

FIG. 6A is a cross-sectional view corresponding to the line B1-B2 line in FIG. 1. FIG. 6B is a cross-sectional view corresponding to the line C1-C2 in FIG. 1.

As shown in FIG. 6A, in a sensor 112 according to the embodiment, the thickness of the first beam electrode 31E is different from the thickness of the second beam electrode 32E. For example, the second thickness along the first direction D1 of the second beam electrode 32E is different from the first thickness along the first direction D1 of the first beam electrode 31E.

As shown in FIG. 6B, the thickness of the first counter beam electrode 31AE is different from the thickness of the second counter beam electrode 32AE. For example, the second counter thickness along the first direction D1 of the second counter beam electrode 32AE is different from the first counter thickness along the first direction D1 of the first counter beam electrode 31AE.

Figure 7A:
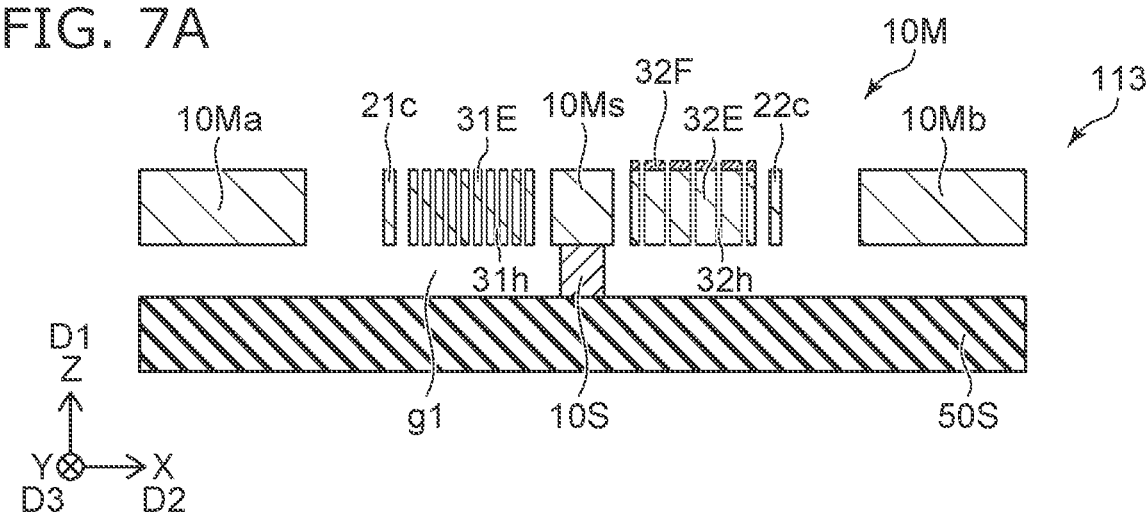
FIG. 7A and FIG. 7B are schematic cross-sectional views illustrating parts of a sensor according to the first embodiment.
Figure 7B:
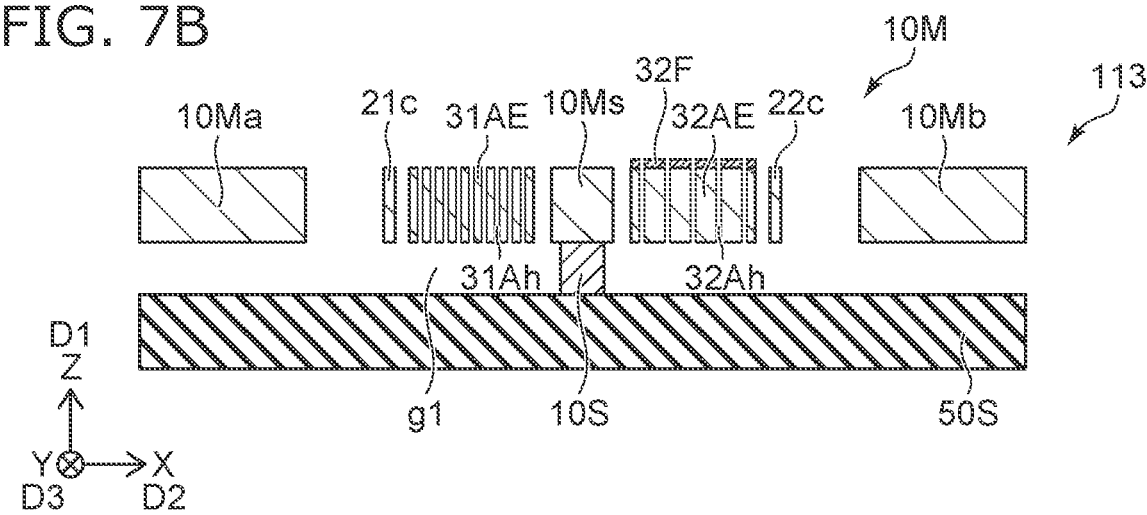

FIG. 7A and FIG. 7B are schematic cross-sectional views illustrating parts of a sensor according to the first embodiment.

FIG. 7A is a cross-sectional view corresponding to the line B1-B2 in FIG. 1. FIG. 7B is a cross-sectional view corresponding to the line C1-C2 in FIG. 1.

As shown in FIG. 7A, in a sensor 113 according to the embodiment, the second beam electrode 32E includes a metal layer 32F. The first beam electrode 31E does not include the metal layer 32F. For example, at least a part of the second material included in the second beam electrode 32E is different from at least a part of the first material included in the first beam electrode 31E.

As shown in FIG. 7B, the second counter beam electrode 32AE includes the metal layer 32F. The first counter beam electrode 31AE does not include the metal layer 32F. For example, at least a part of the second counter material included in the second counter beam electrode 32AE is different from at least a part of the first counter material included in the first counter beam electrode 31AE.

For example, the first beam electrode 31E and the second beam electrode 32E may have different masses.

The first beam electrode 31E and the second beam electrode 32E may satisfy at least one of the following a first condition, a second condition, a third condition, a fourth condition, a fifth condition, a sixth condition, a seventh condition, or an eighth condition.

In the first condition, the second mass of the second beam electrode 32E is different from the first mass of the first beam electrode 31E. In the second condition, the second thickness along the first direction D1 of the second beam electrode 32E is different from the first thickness along the first direction D1 of the first beam electrode 31E. In the third condition, at least a part of the second material included in the second beam electrode 32E is different from at least a part of the first material included in the first beam electrode 31E.

In the fourth condition, the second size of the second hole 32h included in the second beam electrode 32E is different from the first size of the first hole 31h included in the first beam electrode 31E. In the fifth condition, the second density of the second holes 32h is different from the first density of the first holes 31h. In the sixth condition, the second number of second holes 32h is different from the first number of first holes 31h. In the seventh condition, the second shape of the second hole 32h is different from the first shape of the first hole 31h. In the eighth condition, the second layer configuration of the second beam electrode 32E is different from the first layer configuration of the first beam electrode 31E. These conditions may generate a difference in resonance frequency between the first beam 31 and the second beam 32.

The first counter beam electrode 31AE and the second counter beam electrode 32AE may satisfy at least one of a ninth condition, a tenth condition, an eleventh condition, a twelfth condition, a thirteenth condition, a fourteenth condition, a fifteenth condition or a sixth condition.

In the ninth condition, the second counter mass of the second counter beam electrode 32AE is different from the first counter mass of the first counter beam electrode 31AE. In the tenth condition, the second counter thickness along the first direction D1 of the second counter beam electrode 32AE is different from the first counter thickness along the first direction D1 of the first counter beam electrode 31AE. In the eleventh condition, at least a part of the second counter material included in the second counter beam electrode 32AE is different from at least a part of the first counter material included in the first counter beam electrode 31AE. In the twelfth condition, the second counter size of the second counter hole 32Ah included in the second counter beam electrode 32AE is different from the first counter size of the first counter hole 31Ah included in the first counter beam electrode 31AE. In the thirteenth condition, the second counter density of the second counter holes 32Ah is different from the first counter density of the first counter holes 31Ah. In the fourteenth condition, the second counter number of the second counter holes 32Ah is different from the first counter number of the first counter holes 31Ah. In the fifteenth condition, the second counter shape of the second counter hole 32Ah is different from the first counter shape of the first counter hole 31Ah. In the sixteenth condition, the second counter layer configuration of the second counter beam electrode 32AE is different from the first counter layer configuration of the first counter beam electrode 31AE. These conditions may generate a difference in resonance frequency between the first beam 31 and the second beam 32.

In the embodiment, the planar outline of the first beam electrode 31E may be the same as the planar outline of the second beam electrode 32E. The planar outline of the first counter beam electrode 31AE may be the same as the planar outline of the second counter beam electrode 32AE. For example, the same heat dissipation is obtained. For example, the temperature difference between the first beam electrode 31E and the second beam electrode 32E can be suppressed. For example, the temperature difference between the first counter beam electrode 31AE and the second counter beam electrode 32AE can be suppressed.

For example, the first outline of the first planar shape of the first beam electrode 31E in the first plane (X-Y plane) including the second direction D2 and the third direction D3 is substantially the same as the second outline of the second planar shape of the second beam electrode 32E in the first plane.

For example, the first counter beam electrode 31AE is preferably linearly symmetrical with the first beam electrode 31E with respect to an axis passing through the first connection structure 21c and the second connection structure 22c and along the second direction D2. For example, the second counter beam electrode 32AE is preferably linearly symmetrical with the second beam electrode 32E with respect to the axis passing through the first connection structure 21c and the second connection structure 22c and along the second direction D2. Stable vibration is obtained.

As shown in FIG. 1, the first member 10M may further include a first structure 21 and a first support structure 11S. The first structure position in the second direction D2 of the first structure 21 is located between the first movable region position in the second direction D2 of the first movable region 10Ma and the first beam position in the second direction D2 of the first beam 31.

The first connection structure position in the second direction D2 of the first connection structure 21c is located between the first structure position and the first beam position. The first support structure position in the second direction D2 of the first support structure 11S is located between the first structure position and the first support region position in the second direction D2 of the first support region 10Ms.

The first structure 21 includes a first portion 21e, a first other portion 21f and a first intermediate portion 21m. A direction from the first portion 21e to the first other portion 21f is along the third direction D3. The first intermediate portion 21m is provided between the first portion 21e and the first other portion 21f. The first portion 21e is connected to the first connection structure 21c. The first other portion 21f is connected to the first movable region 10Ma. The first intermediate portion 21m is connected to the first support structure 11S.

As shown in FIG. 1, the first member 10M may further include a third structure 23 and a third support structure 13S. The third structure position in the second direction D2 of the third structure 23 is located between the second beam position in the second direction D2 of the second beam 32 and the second movable region position in the second direction D2 of the second movable region 10Mb.

The second connection structure position in the second direction D2 of the second connection structure 22c is located between the second beam position and the third structure position. The third support structure position in the second direction D2 of the third support structure 13S is located between the first support region position and the third structure position.

The third structure 23 includes a third portion 23e, a third other portion 23f and a third intermediate portion 23m. A direction from the third portion 23e to the third other portion 23f is along the third direction D3. The third intermediate portion 23m is provided between the third portion 23e and the third other portion 23f. The third portion 23e is connected to the second connection structure 22c. The third other portion 23f is connected to the second movable region 10Mb. The third intermediate portion 23m is connected to the third support structure 13S.

As shown in FIG. 1, the first member 10M may further include a second structure 22 and a second support structure 12S. The second structure position in the second direction D2 of the second structure 22 is located between the first movable region position and the first beam position. The second support structure position in the second direction D2 of the second support structure 12S is located between the second structure position and the first support region position.

The second structure 22 includes a second portion 22e, a second other portion 22f and a second intermediate portion 22m. A direction from the second other portion 22f to the second portion 22e is along the third direction D3. The second intermediate portion 22m is provided between the second other portion 22f and the second portion 22e. The second portion 22e is connected to the first connection structure 21c. The second other portion 22f is connected to the first movable region 10Ma. The second intermediate portion 22m is connected to the second support structure 12S. In the third direction D3, the first connection structure 21c is provided between at least a part of the second support structure 12S and at least a part of the first support structure 11S.

As shown in FIG. 1, the first member 10M may further include a fourth structure 24 and a fourth support structure 14S. A fourth structure position in the second direction D2 of the fourth structure 24 is located between the second beam position and the second movable region position. A fourth support structure position in the second direction D2 of the fourth support structure 14S is located between the first support region position and the fourth structure position.

The fourth structure 24 includes a fourth portion 24e, a fourth other portion 24f and a fourth intermediate portion 24m. A direction from the fourth other portion 24f to the fourth portion 24e is along the third direction D3. The fourth intermediate portion 24m is provided between the fourth other portion 24f and the fourth portion 24e. The fourth portion 24e is connected to the second connection structure 22c. The fourth other portion 24f is connected to the second movable region 10Mb. The fourth intermediate portion 24m is connected to the fourth support structure 14S. In the third direction D3, the second connection structure 22c is provided between at least a part of the fourth support structure 14S and at least a part of the third support structure 13S.

The first structure 21, the second structure 22, the third structure 23 and the fourth structure 24 are, for example, levers. The first portion 21e is, for example, an action point. The first other portion 21f is, for example, the point of effort. The first intermediate portion 21m is, for example, a fulcrum. The second portion 22e is, for example, an action point. The second other portion 22f is, for example, a point of effort. The second intermediate portion 22m is, for example, a fulcrum. The third portion 23e is, for example, an action point. The third other portion 23f is, for example, a point of effort. The third intermediate portion 23m is, for example, a fulcrum. The fourth portion 24e is, for example, an action point. The fourth other portion 24f is, for example, the point of effort. The fourth intermediate portion 24m is, for example, a fulcrum.

The displacement of the first movable region 10Ma is efficiently transmitted to the first connection structure 21c by the first structure 21 and the second structure 22. The displacement of the second movable region 10Mb is efficiently transmitted to the second connection structure 22c by the third structure 23 and the fourth structure 24.

A distance along the third direction D3 between the first portion 21e and the first intermediate portion 21m is defined as a first distance. A distance along the third direction D3 between the first intermediate portion 21m and the first other portion 21f is defined as a second distance. For example, the first distance is shorter than the second distance. With such the first structure 21, for example, the displacement of the first movable region 10Ma along the second direction D2 is efficiently transmitted to the first connection structure 21c. The configuration regarding the first structure 21 can be applied to the second structure 22, the third structure 23 and the fourth structure 24.

As shown in FIG. 1, the first member 10M may include a third movable region 10Mc and a fourth movable region 10Md. A direction from the fourth movable region 10Md to the third movable region 10Mc is along the third direction D3. The third movable region 10Mc and the fourth movable region 10Md are continuous with the first movable region 10Ma and the second movable region 10Mb. The first support region 10Ms is provided between the third movable region 10Mc and the fourth movable region 10Md.

As shown in FIG. 3, the first member 10M may further include a first movable region connecting portion 11A. A position of the first support structure 11S in the third direction D3 is located between the position of the first support region 10Ms in the third direction D3 and the position of the third movable region 10Mc in the third direction D3. The first movable region connecting portion 11A connects the first support structure 11S to the third movable region 10Mc. Displacement along the third direction D3 of the first support structure 11S is suppressed by providing the first movable region connecting portion 11A. The displacement along the second direction D2 of the first support structure 11S becomes stable.

As shown in FIG. 3, the first member 10M may further include a second movable region connecting portion 12A. A position of the second support structure 12S in the third direction D3 is located between the position of the fourth movable region 10Md in the third direction D3 and the position of the first support region 10Ms in the third direction D3. The second movable region connecting portion 12A connects the second support structure 12S to the fourth movable region 10Md. Displacement along the third direction D3 of the second support structure 12S is suppressed by providing the second movable region connecting portion 12A. The displacement along the second direction D2 of the second support structure 12S becomes stable.

As shown in FIG. 3, the first member 10M may further include a third movable region connecting portion 13A. A position of the third support structure 13S in the third direction D3 is located between the position of the first support region 10Ms in the third direction D3 and the position of the third movable region 10Mc in the third direction D3. The third movable region connecting portion 13A connects the third support structure 13S to the third movable region 10Mc. Displacement along the third direction D3 of the third support structure 13S is suppressed by providing the third movable region connecting portion 13A. The displacement along the second direction D2 of the third support structure 13S becomes stable.

As shown in FIG. 3, the first member 10M may further include a fourth movable region connecting portion 14A. A position of the fourth support structure 14S in the third direction D3 is located between the position of the fourth movable region 10Md in the third direction D3 and the position of the first support region 10Ms in the third direction D3. The fourth movable region connecting portion 14A connects the fourth support structure 14S to the fourth movable region 10Md. Displacement along the third direction D3 of the fourth support structure 14S is suppressed by providing the fourth movable region connecting portion 14A. The displacement along the second direction D2 of the fourth support structure 14S becomes stable.

The above configuration described with respect to sensor 110 may be applied to sensors 111-113.

As shown in FIG. 1, the first beam electrode 31E includes a first extending portion 31Ea and a first connecting portion 31Ex. The first extending portion 31Ea extends along the second direction D2. The first connecting portion 31Ex connects the first extending portion 31Ea to the first beam 31. The configuration of the first beam electrode 31E may be applied to the first counter beam electrode 31AE, the second beam electrode 32E, and the second counter beam electrode 32AE.

Figure 8:
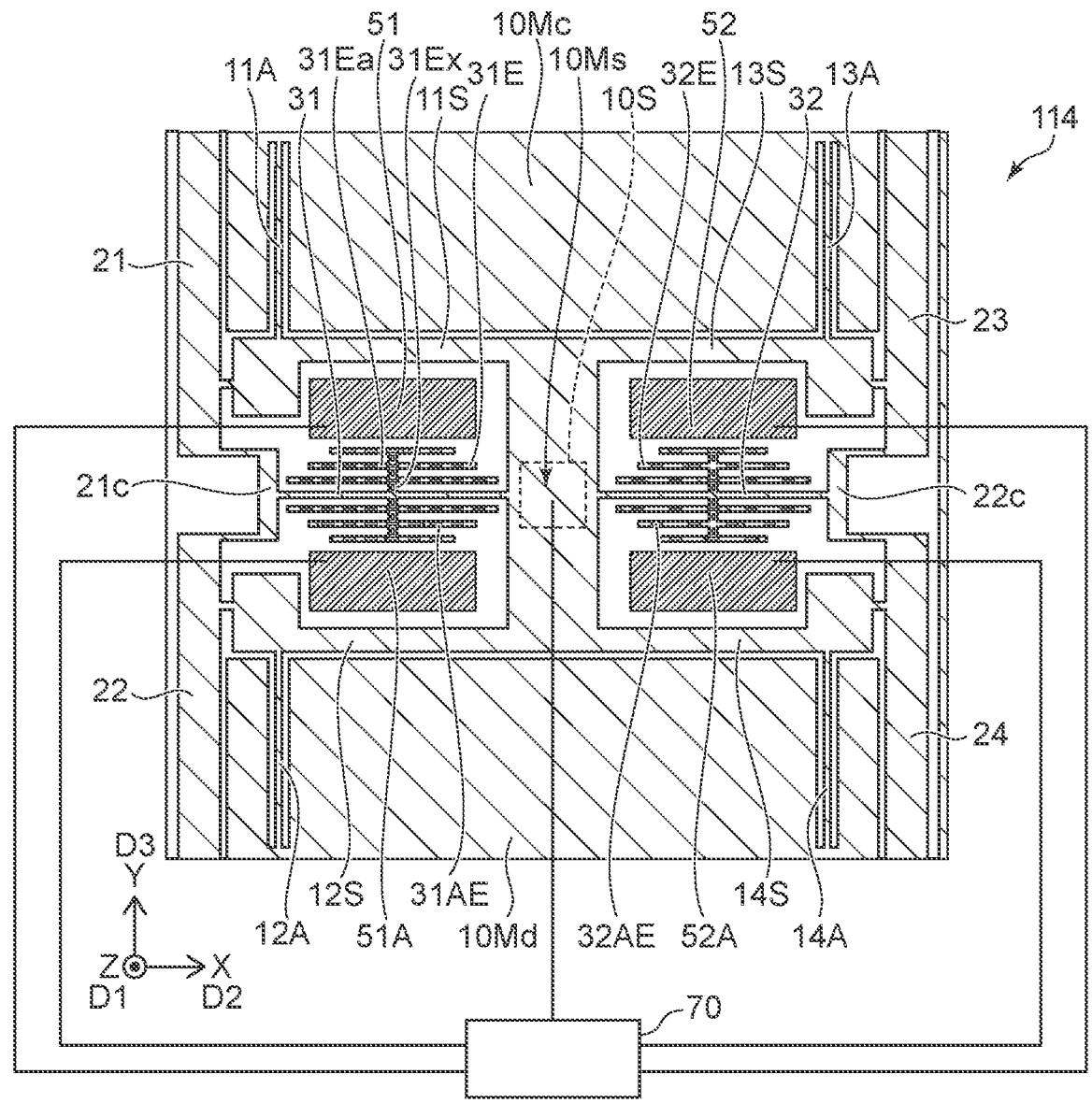
FIG. 8 is a schematic plan view illustrating a sensor according to the first embodiment.

FIG. 8 is a schematic plan view illustrating a sensor according to the first embodiment.

Figure 9A:
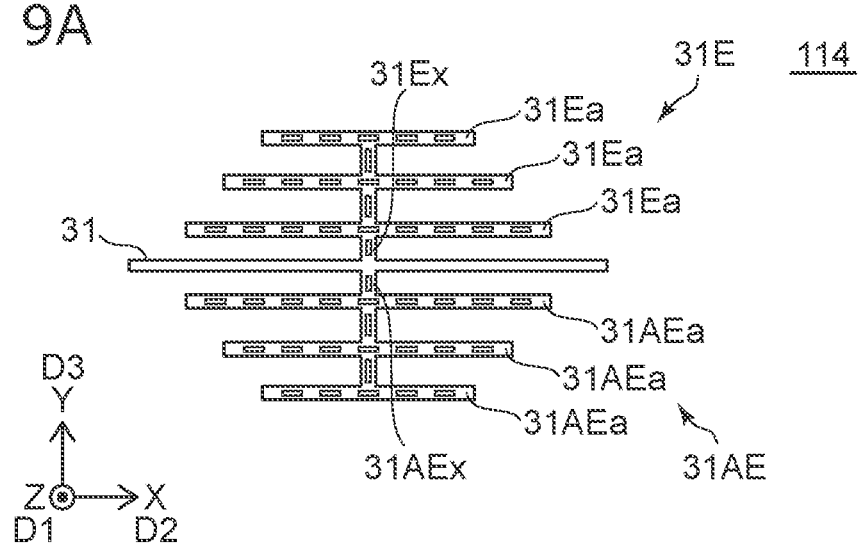
FIG. 9A and FIG. 9B are schematic plan views illustrating the sensor according to the first embodiment.
Figure 9B:
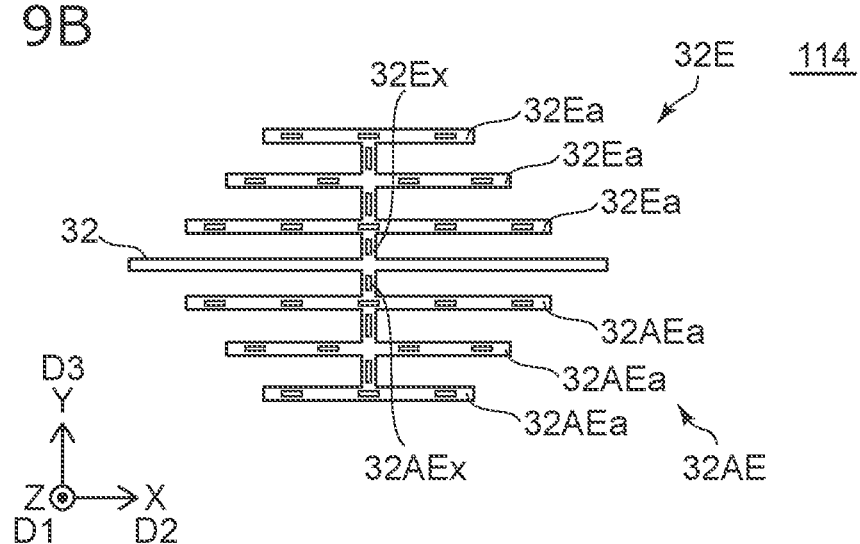

FIG. 9A and FIG. 9B are schematic plan views illustrating the sensor according to the first embodiment.

FIG. 9A and FIG. 9B illustrate a part of FIG. 8.

As shown in FIG. 8, in a sensor 114 according to the embodiment, the first beam electrode 31E includes a first extending portion 31Ea extending along the second direction D2 and a first connecting portion 31Ex connecting the first extending portion 31Ea to the first beam 31. In the sensor 114, the first beam electrode 31E includes a plurality of first extending portions 31Ea.

As shown in FIG. 9A, a plurality of first extending portions 31Ea are provided. The first connecting portion 31Ex connects the plurality of first extending portions 31Ea to each other. One of the plurality of first extending portions 31Ea is provided between the first beam 31 and another one of the plurality of first extending portions 31Ea. The length of the one of the first extending portions 31Ea along the second direction D2 is longer than the length of the other one of the first extending portions 31Ea along the second direction D2. The length of the plurality of first extending portions 31Ea along the second direction D2 becomes shorter as leaving from the first beam 31.

For example, one of the plurality of first extending portions 31Ea may be provided between a part of the first electrode 51 and a part of the first counter electrode 51A. By providing the plurality of first extending portions 31Ea, the first beam 31 can be vibrated more effectively. By the plurality of first extending portions 31Ea, the resonance frequency of the first beam 31 can be more effectively detected.

As shown in FIG. 9A, the first counter beam electrode 31AE may include a first counter extending portion 31AEa extending along the second direction D2 and a first counter connecting portion 31AEx connecting the first counter extending portion 31AEa to the first beam 31. In this example, a plurality of first counter extending portions 31AEa are provided. The first counter connecting portion 31AEx connects the plurality of first counter extending portions 31AEa to each other. One of the plurality of first counter extending portions 31AEa is provided between the first beam 31 and another one of the plurality of first counter extending portions 31AEa. The length of the one of the plurality of first counter extending portions 31AEa along the second direction D2 is longer than the length of another one of the plurality of first counter extending portions 31AEa along the second direction D2. The length of the plurality of first counter extending portions 31AEa along the second direction D2 becomes shorter as leaving from the first beam 31.

As shown in FIG. 9B, the second beam electrode 32E may include a second extending portion 32Ea extending along the second direction D2 and a second connecting portion 32Ex connecting the second extending portion 32Ea to the second beam 32. A plurality of second extending portions 32Ea are provided. The second connecting portion 32Ex connects the plurality of second extending portions 32Ea to each other. One of the plurality of second extending portions 32Ea is provided between the second beam 32 and another one of the plurality of second extending portions 32Ea. The length of the one of the plurality of second extending portions 32Ea along the second direction D2 is longer than the length of the other one of the plurality of second extending portions 32Ea along the second direction D2. The length of the plurality of second extending portions 32Ea along the second direction D2 becomes shorter as leaving from the second beam 32.

As shown in FIG. 9B, the second counter beam electrode 32AE may include a second counter extending portion 32AEa extending along the second direction D2 and a second counter connecting portion 32AEx connecting the second counter extending portion 32AEa to the second beam 32. In this example, a plurality of second counter extending portions 32AEa are provided. The second counter connecting portion 32AEx connects the plurality of second counter extending portions 32AEa to each other. One of the plurality of second counter extending portions 32AEa is provided between the second beam 32 and another one of the plurality of second counter extending portions 32AEa. The length of the one of the plurality of second counter extending portions 32AEa along the second direction D2 is longer than the length of the other one of the plurality of second counter extending portions 32AEa along the second direction D2. The length of the plurality of second counter extending portions 32AEa along the second direction D2 becomes shorter as leaving from the second beam 32.

A wide dynamic range can be obtained in the sensors 111 to 114 as well. A sensor capable of improving characteristics can be provided.

Figure 10:
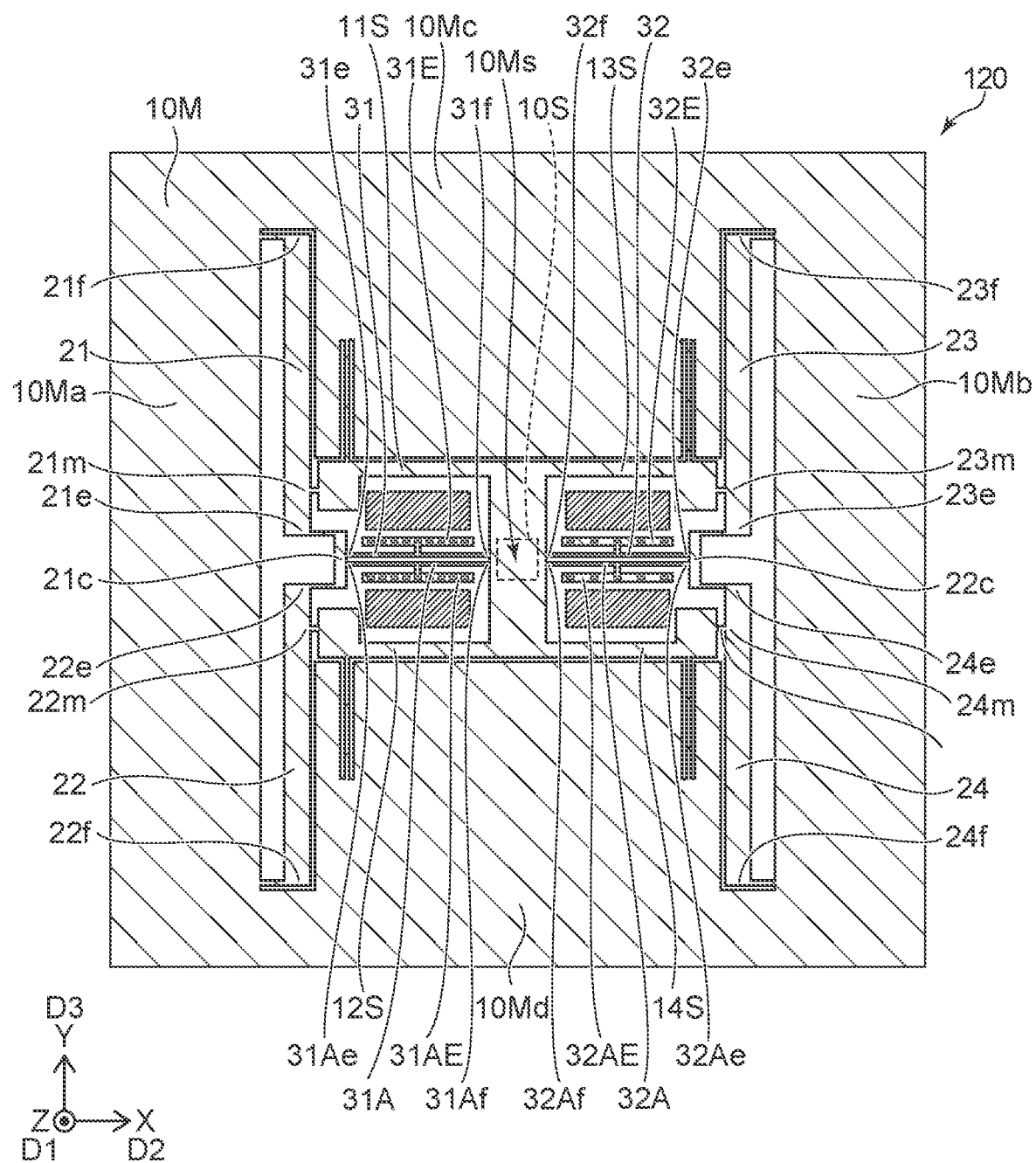
FIG. 10 is a schematic plan view illustrating a sensor according to the first embodiment.

FIG. 10 is a schematic plan view illustrating a sensor according to the first embodiment.

As shown in FIG. 10, in a sensor 120 according to the embodiment, in addition to the first beam 31 and the second beam 32, a first counter beam 31A and a second counter beam 32A are provided. The configuration of the sensor 120 excluding this may be the same as the configuration of the sensor 110.

In the sensor 120, the first member 10M includes the first counter beam 31A, the second counter beam 32A, the first counter beam electrode 31AE and a second counter beam electrode 32AE. The first counter beam 31A and the second counter beam 32A extend along the second direction D2.

The first counter beam 31A includes a first counter end 31Ae and a first counter other end 31Af. The first counter end 31Ae is connected to the first connection structure 21c. The first counter other end 31Af is connected to the first support region 10Ms.

The second counter beam 32A includes a second counter end 32Ae and a second counter other end 32Af. The second counter end 32Ae is connected to the second connection structure 22c. The second counter other end 32Af is connected to the first support region 10Ms.

The first counter beam electrode 31AE is connected to the first counter beam 31A. The first counter beam 31A is provided between the first counter beam electrode 31AE and the first beam electrode 31E in the third direction D3. The first beam 31 is provided between the first counter beam 31A and the first beam electrode 31E in the third direction D3.

The second counter beam electrode 32AE is connected to the second counter beam 32A. In the third direction D3, the second counter beam 32A is provided between the second counter beam electrode 32AE and the second beam electrode 32E. The second beam 32 is provided between the second counter beam 32A and the second beam electrode 32E in the third direction D3.

The first counter beam electrode 31AE and the second counter beam electrode 32AE satisfy at least one of the ninth condition, the tenth condition, the eleventh condition, the twelfth condition, the thirteenth condition, the fourteenth condition, the fifteenth condition, and the sixteenth condition. A wide dynamic range is also obtained in the sensor 120. A sensor capable of improving characteristics can be provided.

In the sensor 120, the first electrode 51 and the first counter electrode 51A may be provided (see FIG. 3). The first electrode 51 faces the first beam electrode 31E. The first counter electrode 51A faces the first counter beam electrode 31AE. The second electrode 52 and the second counter electrode 52A may be provided (see FIG. 3). The second electrode 52 faces the second beam electrode 32E. The second counter electrode 52A faces the second counter beam electrode 32AE.

In the sensor 120, the controller 70 (see FIG. 3) is configured to apply the drive signal including the AC component between the first electrode 51 and the first beam electrode 31E. The controller 70 is configured to detect the electrical signal generated between the first counter electrode 51A and the first counter beam electrode 31AE. The controller 70 (see FIG. 3) is configured to apply the drive signal including the AC component between the second electrode 52 and the second beam electrode 32E. The controller 70 is configured to detect the electrical signal generated between the second counter electrode 52A and the second counter beam electrode 32AE.

Figure 11A:
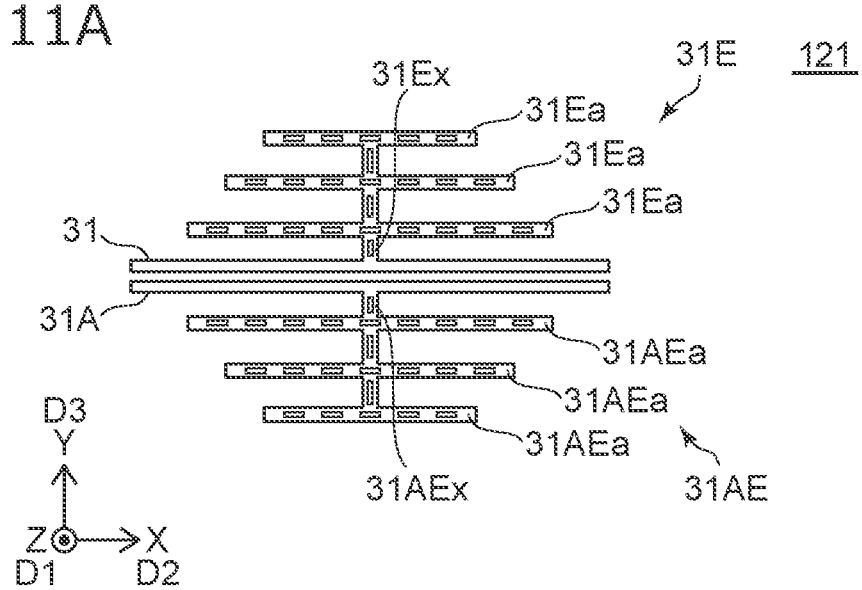
FIG. 11A and FIG. 11B are schematic plan views illustrating a sensor according to the first embodiment.
Figure 11B:
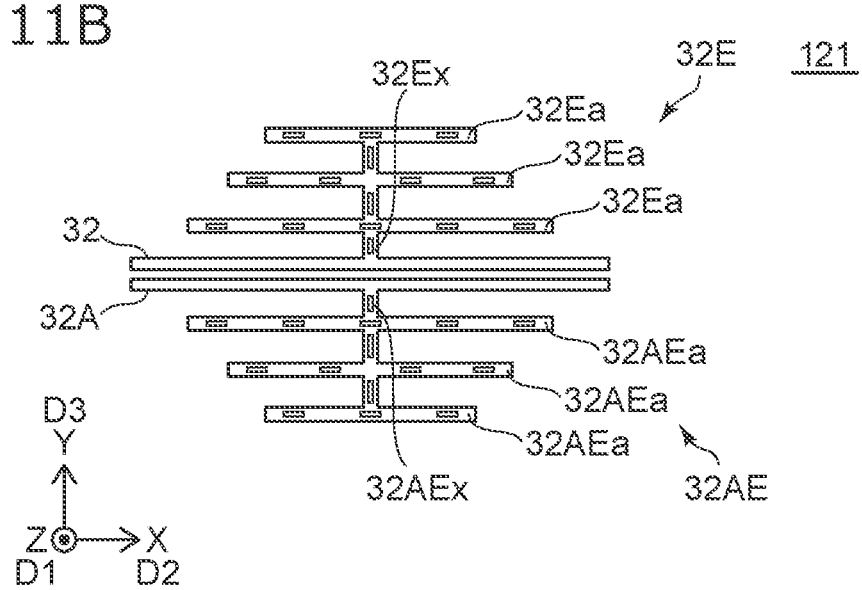

FIG. 11A and FIG. 11B are schematic plan views illustrating a sensor according to the first embodiment.

As shown in FIG. 11A, in a sensor 121 according to the embodiment, a plurality of first extending portions 31Ea are provided. One of the plurality of first extending portions 31Ea is provided between the first beam 31 and another one of the plurality of first extending portions 31Ea. The length of the one of the plurality of first extending portions 31Ea along the second direction D2 is longer than the length of the other one of the plurality of first extending portions 31Ea along the second direction D2.

As shown in FIG. 11A, a plurality of first counter extending portions 31AEa may be provided. One of the plurality of first counter extending portions 31AEa is provided between the first beam 31 and another one of the plurality of first counter extending portions 31AEa. The length of the one of the plurality of first counter extending portions 31AEa along the second direction D2 is longer than the length of the other one of the plurality of first counter extending portions 31AEa along the second direction D2.

As shown in FIG. 11B, a plurality of second extending portions 32Ea may be provided. One of the plurality of second extending portions 32Ea is provided between the second beam 32 and another one of the plurality of second extending portions 32Ea. The length of the one of the plurality of second extending portions 32Ea along the second direction D2 is longer than the length of the other one of the plurality of second extending portions 32Ea along the second direction D2.

As shown in FIG. 11B, a plurality of second extending portions 32Ea may be provided. One of the plurality of second extending portions 32Ea is provided between the second beam 32 and another one of the plurality of second extending portions 32Ea. The length of the one of the plurality of second extending portions 32Ea along the second direction D2 is longer than the length of the other one of the plurality of second extending portions 32Ea along the second direction D2.

As already explained, at least a part of the first member 10M may be conductive. The first member 10M may include, for example, conductive silicon. The first member 10M may include, for example, a metal layer. For example, high heat dissipation can be obtained.

Second Embodiment

The second embodiment relates to an electronic device.

Figure 12:
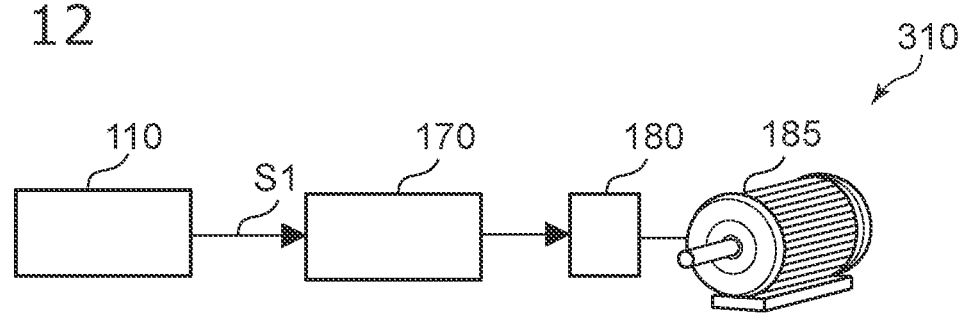
FIG. 12 is a schematic diagram illustrating an electronic device according to a second embodiment.

FIG. 12 is a schematic diagram illustrating an electronic device according to the second embodiment.

As shown in FIG. 12, an electronic device 310 according to the embodiment includes the sensor according to the first embodiment and a circuit controller 170. In the example of FIG. 12, the sensor 110 is drawn as the sensor. The circuit controller 170 is configured to control a circuit 180 based on a signal 51 obtained from the sensor. The circuit 180 is, for example, a control circuit of a driving device 185 or the like. According to the embodiment, for example, the circuit 180 for controlling the driving device 185 can be controlled with high precision.

FIGS. 13A to 13H are schematic diagrams illustrating applications of the electronic device according to the embodiment.

Figure 13A:
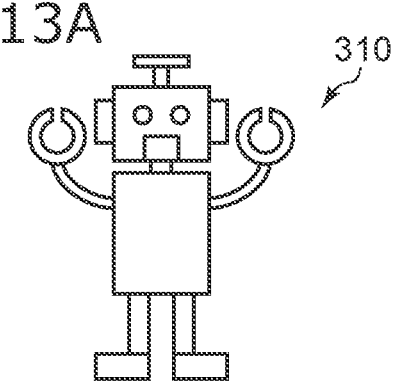
FIGS. 13A to 13H are schematic diagrams illustrating applications of the electronic device according to the embodiment.
Figure 13B:
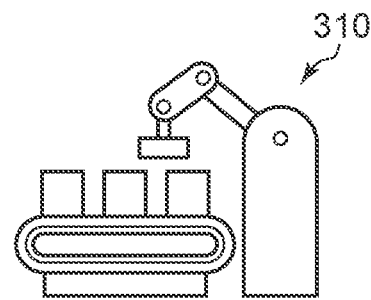
Figure 13C:
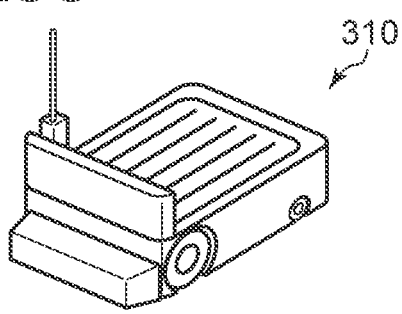
Figure 13D:
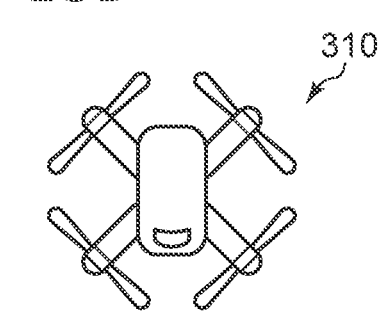
Figure 13E:
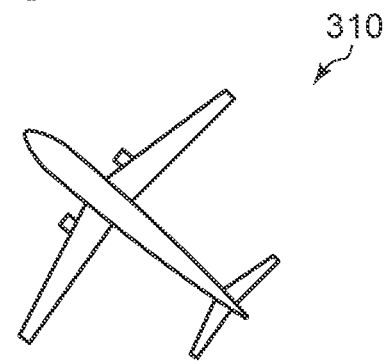
Figure 13F:
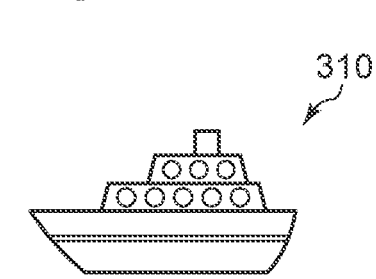
Figure 13G:
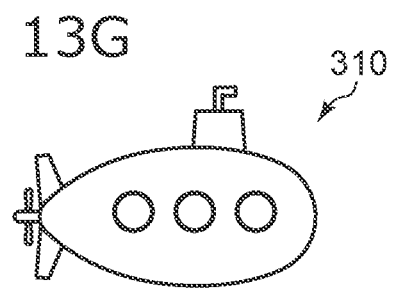
Figure 13H:
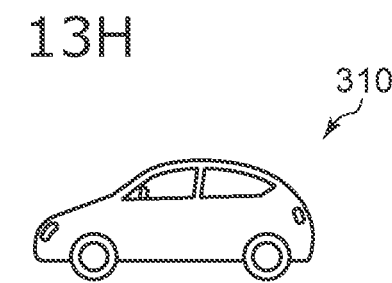

As shown in FIG. 13A, the electronic device 310 may be at least a part of a robot. As shown in FIG. 13B, the electronic device 310 may be at least a part of a work robot provided in a manufacturing factory or the like. As shown in FIG. 13C, the electronic device 310 may be at least a part of an automated guided vehicle such as in a factory. As shown in FIG. 13D, the electronic device 310 may be at least a part of a drone (unmanned aerial vehicle). As shown in FIG. 13E, the electronic device 310 may be at least a part of an airplane. As shown in FIG. 13F, the electronic device 310 may be at least a part of a vessel. As shown in FIG. 13G, the electronic device 310 may be at least a part of a submarine. As shown in FIG. 13H, the electronic device 310 may be at least a part of an automobile. The electronic device 310 may include, for example, at least one of a robot or a mobile object.

Figure 14A:
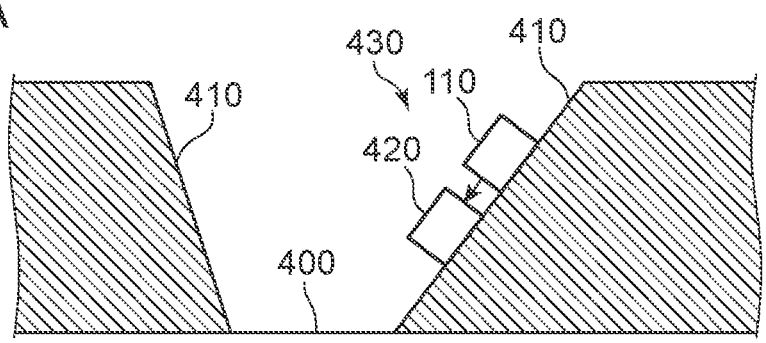
FIGS. 14A and 14B are schematic diagrams illustrating applications of the sensor according to the embodiment.
Figure 14B:
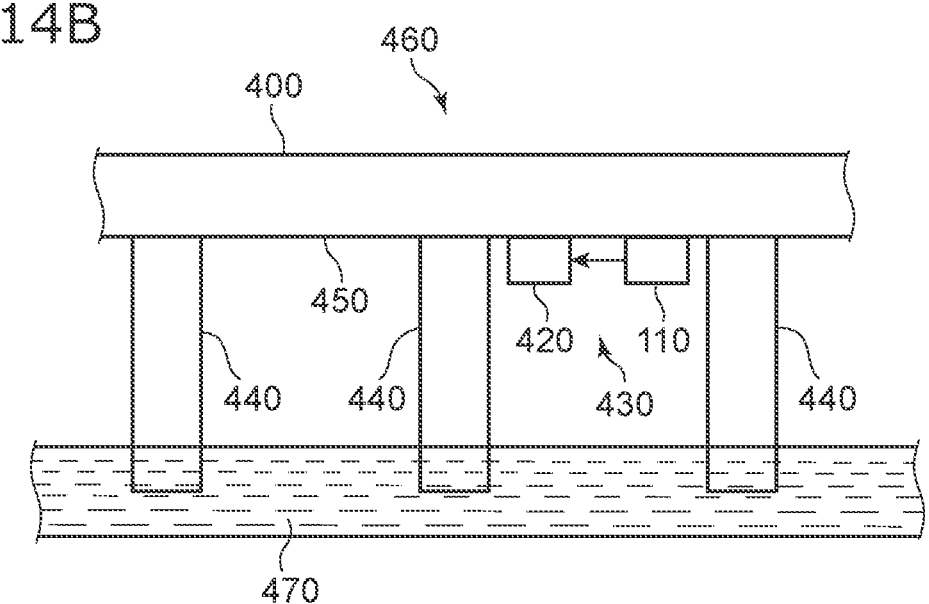

FIGS. 14A and 14B are schematic diagrams illustrating applications of the sensor according to the embodiment.

As shown in FIG. 14A, a sensor 430 according to the embodiment includes the sensor according to the first embodiment and a transmitter/receiver 420. In the example of FIG. 14A, the sensor 110 is drawn as the sensor. The transmitter/receiver 420 is configured to transmit the signal obtained from the sensor 110 by at least one of wireless or wired methods, for example. The sensor 430 is provided, for example, on a slope surface 410 such as a road 400. The sensor 430 may, for example, monitor conditions such as facilities (e.g., infrastructure). The sensor 430 may be, for example, a condition monitoring device.

For example, the sensor 430 detects changes in the state of the slope surface 410 of the road 400 with high accuracy. A change in the state of the slope surface 410 includes, for example, at least one of a change in tilt angle or a change in vibration state. The signal (test result) obtained from the sensor 110 is transmitted by the transmitter/receiver 420. The condition of facilities (e.g., infrastructure) can be monitored, e.g., continuously.

As shown in FIG. 14B, the sensor 430 is provided on a part of a bridge 460, for example. The bridge 460 is provided over a river 470. For example, the bridge 460 includes at least one of main girder 450 and a bridge pier 440. The sensor 430 is provided on at least one of the main girder 450 and the bridge pier 440. For example, the angle of at least one of the main girder 450 and the bridge pier 440 may change due to deterioration or the like. For example, in at least one of the main girder 450 and the bridge pier 440, the vibration state may change. The sensor 430 detects these changes with high accuracy. A detection result can be transmitted to an arbitrary place by the transmitter/receiver 420. Anomalies can be effectively detected.

The embodiments include the following configurations (for example, technical proposals).

(Configuration 1)

A sensor, comprising:
a base;
a first support portion fixed to the base; and
a first member supported by the first support portion,
a gap being provided between the base and the first member,
the first member including a first support region, a first movable region, a second movable region, a first connection structure, a second connection structure, a first beam, a second beam, a first beam electrode and a second beam electrode,
the first support being between the base and the first support region in a first direction from the base to the first support,
the first support region being supported by the first support portion,
the first beam and the second beam extending along a second direction crossing the first direction,
in the second direction, the first support region being between the first movable region and the second movable region,
the first connection structure being supported by the first movable region,
the first connection structure being between the first movable region and the first support region in the second direction,
the first beam including a first end and a first other end, the first end being connected to the first connection structure, the first other end being connected to the first support region,
the second connection structure being supported by the second movable region,
the second connection structure being between the first support region and the second movable region in the second direction,
the second beam including a second end and a second other end, the second end being connected to the second connection structure, the second other end being connected to the first support region,
the first beam electrode being connected to the first beam,
a third direction from the first beam to the first beam electrode crossing a plane including the first direction and the second direction,
the second beam electrode being connected to the second beam,
a direction from the second beam to the second beam electrode being along the third direction,
the first beam electrode and the second beam electrode satisfying at least one of a first condition, a second condition, a third condition, a fourth condition, a fifth condition, a sixth condition, a seventh condition or an eighth condition,
in the first condition, the second mass of the second beam electrode being different from the first mass of the first beam electrode,
in the second condition, a second thickness of the second beam electrode along the first direction being different from a first thickness of the first beam electrode along the first direction,
in the third condition, at least a part of the second material included in the second beam electrode being different from at least a part of the first material included in the first beam electrode,
in the fourth condition, a second size of a second hole included in the second beam electrode being different from a first size of a first hole included in the first beam electrode,
in the fifth condition, a second density of the second holes being different from a first density of the first holes,
in the sixth condition, a second number of the second holes being different from a first number of the first holes,
in the seventh condition, a second shape of the second hole being different from a first shape of the first hole, and
in the eighth condition, a second layer configuration of the second beam electrode being different from a first layer configuration of the first beam electrode.

(Configuration 2)

The sensor according to Configuration 1, further comprising:
a first electrode fixed to the base; and
a first counter electrode fixed to the base,
the first member further including a first counter beam electrode connected to the first beam,
the first beam being between the first counter beam electrode and the first beam electrode in the third direction,
the first electrode facing the first beam electrode, and
the first counter electrode facing the first counter beam electrode.

(Configuration 3)

The sensor according to Configuration 2, further comprising:
a controller,
the controller being configured to apply a drive signal including an AC component between the first electrode and the first beam electrode, and
the controller being configured to detect an electrical signal generated between the first counter electrode and the first counter beam electrode.

(Configuration 4)

The sensor according to Configuration 1, wherein
the first member includes a first counter beam electrode and a second counter beam electrode,
the first counter beam electrode is connected to the first beam,
the first beam is between the first counter beam electrode and the first beam electrode in the third direction,
the second counter beam electrode is connected to the second beam,
the second beam is between the second counter beam electrode and the second beam electrode in the third direction,
the first counter beam electrode and the second counter beam electrode satisfy at least one of a ninth condition, a tenth condition, an eleventh condition, a twelfth condition, a thirteenth condition, a fourteenth condition, a fifteenth condition or the sixteenth condition,
in the ninth condition, a second counter mass of the second counter beam electrode is different from a first counter mass of the first counter beam electrode,
in the tenth condition, a second counter thickness of the second counter beam electrode along the first direction is different from a first counter thickness of the first counter beam electrode along the first direction,
in the eleventh condition, at least a part of a second counter material included in the second facing beam electrode is different from at least a part of a first counter material included in the first facing beam electrode,
in the twelfth condition, a second counter size of a second counter hole included in the second counter beam electrode is different from a first counter size of a first counter hole included in the first counter beam electrode,
in the thirteenth condition, a second counter density of the second facing holes is different from a first counter density of the first facing holes,
in the fourteenth condition, a second counter number of the second counter holes is different from a first counter number of the first counter holes,
in the fifteenth condition, a second counter shape of the second counter hole is different from the first counter shape of the first facing hole, and
in the sixteenth condition, a second counter layer configuration of the second counter beam electrode is different from the first counter layer configuration of the first counter beam electrode.

(Configuration 5)

The sensor according to Configuration 4, further comprising:
a first electrode fixed to the base; and
a first counter electrode fixed to the base,
the first electrode facing the first beam electrode, and
the first counter electrode facing the first counter beam electrode.

(Configuration 6)

The sensor according to Configuration 5, further comprising:
a controller,
the controller being configured to apply a drive signal including an AC component between the first electrode and the first beam electrode, and
the controller being configured to detect an electrical signal generated between the first counter electrode and the first counter beam electrode.

(Configuration 7)

The sensor according to Configuration 4, wherein
the first member further includes a first structure and a first support structure,
a first structure position of the first structure in the second direction is located between a first movable region position of the first movable region in the second direction and a first beam position of the first beam in the second direction,
a first connection structure position of the first connection structure in the second direction is located between the first structure position and the first beam position,
a first support structure position in the second direction of the first support structure is located between the first structure position and a first support region position in the second direction of the first support region,
the first structure includes a first portion, a first other portion, and a first intermediate portion,
a direction from the first portion to the first other portion is along the third direction,
the first intermediate portion is provided between the first portion and the first other portion,
the first portion is connected to the first connection structure,
the first other portion is connected to the first movable region, and
the first intermediate portion is connected to the first support structure.

(Configuration 8)

The sensor according to Configuration 7, wherein
the first member further includes a third structure and a third support structure,
a third structure position of the third structure in the second direction is located between a second beam position of the second beam in the second direction and a second movable region position of the second movable region in the second direction,
a second connection structure position of the second connection structure in the second direction is located between the second beam position and the third structure position, and
a third support structure position in the second direction of the third support structure is located between the first support region position and the third structure position,
the third structure includes a third portion, a third other portion, and a third intermediate portion,
a direction from the third portion to the third other portion is along the third direction,
the third intermediate portion is provided between the third portion and the third other portion;
the third portion is connected to the second connection structure,
the third other portion is connected to the second movable region, and
the third intermediate portion is connected to the third support structure.

(Configuration 9)

The sensor according to Configuration 8, wherein
the first member further includes a second structure and a second support structure,
a second structure position of the second structure in the second direction is located between the first movable region position and the first beam position,
a second support structure position of the second support structure in the second direction is located between the second structure position and the first support region position, the second structure includes a second portion, a second other portion, and a second intermediate portion, a direction from the second other portion to the second portion is along the third direction, the second intermediate portion is provided between the second other portion and the second portion, the second portion is connected to the first connection structure, the second other portion is connected to the first movable region, the second intermediate portion is connected to the second support structure, and in the third direction, the first connection structure is provided tween at least a part of the second support structure and at least a part of the first support structure.

(Configuration 10)

The sensor according to Configuration 9, wherein the first member includes a fourth structure and a fourth support structure, a fourth structure position in the second direction of the fourth structure is located between the second beam position and the second movable region position, a fourth support structure position in the second direction of the fourth support structure is located between the first support region position and the fourth structure position, the fourth structure includes a fourth portion, a fourth other portion, and a fourth intermediate portion;

a direction from the fourth other portion to the fourth portion is along the third direction, a fourth intermediate portion is provided between the fourth other portion and the fourth portion, the fourth portion is connected to the second connection structure, the fourth other portion is connected to the second movable region, the fourth intermediate portion is connected to the fourth support structure, and in the third direction, the second connection structure is provided between at least a part of the fourth support structure and at least a part of the third support structure.

(Configuration 11)

The sensor according to Configuration 1, wherein the first member further includes a first structure and a first support structure, a first structure position of the first structure in the second direction is located between a first movable region position of the first movable region in the second direction and a first beam position of the first beam in the second direction, a first connection structure position of the first connection structure in the second direction is located between the first structure position and the first beam position, a first support structure position in the second direction of the first support structure is located between the first structure position and a first support region position in the second direction of the first support region, the first structure includes a first portion, a first other portion, and a first intermediate portion, a direction from the first portion to the first other portion is along the third direction, the first intermediate portion is provided between the first portion and the first other portion, the first portion is connected to the first connection structure, the first other portion is connected to the first movable region, the first intermediate portion is connected to the first support structure, the first member includes a first counter beam, a second counter beam, a first counter beam electrode, and a second counter beam electrode, the first counter beam and the second counter beam extend in the second direction, the first counter beam includes a first counter end and a first counter other end, the first counter end is connected to the first connecting structure, and the first counter other end is connected to the first supporting region, the second counter beam includes a second counter end and a second counter end, the second counter end is connected to the second connecting structure, and the second counter end is connected to the first supporting region, the first counter beam electrode is connected to the first counter beam, in the third direction, the first counter beam is provided between the first counter beam electrode and the first beam electrode, in the third direction, the first beam is provided between the first counter beam and the first beam electrode, the second counter beam electrode is connected to the second counter beam, in the third direction, the second counter beam is provided between the second counter beam electrode and the second beam electrode, in the third direction, the second beam is provided between the second counter beam and the second beam electrode, the first counter beam electrode and the second counter beam electrode satisfy at least one of a ninth condition, a tenth condition, an eleventh condition, a twelfth condition, a thirteenth condition, a fourteenth condition, a fifteenth condition or a sixteenth condition, in the ninth condition, a second counter mass of the second counter beam electrode is different from a first counter mass of the first counter beam electrode, in the tenth condition, a second counter thickness along the first direction of the second counter beam electrode is different from a first counter thickness along the first direction of the first counter beam electrode, in the eleventh condition, at least a part of a second counter material included in the second counter beam electrode is different from at least a part of a first counter material included in the first counter beam electrode, in the twelfth condition, a second counter size of a second counter hole included in the second counter beam electrode is different from a first counter size of a first counter hole included in the first counter beam electrode, in the thirteenth condition, a second counter density of the second counter hole is different from a first counter density of the first counter hole, in the fourteenth condition, a number of the second counter holes is different from a number of the first counter holes, in the fifteenth condition, the second counter shape of the second counter hole is different from the first counter shape of the first counter hole, and in the sixteenth condition, a second counter layer configuration of the second counter beam electrode is different from a first counter layer configuration of the first counter beam electrode.

(Configuration 12)

The sensor according to Configuration 11, wherein
the first member further includes a third structure and a third support structure,
a third structure position of the third structure in the second direction is located between a second beam position of the second beam in the second direction and a second movable region position of the second movable region in the second direction,
a second connection structure position of the second connection structure in the second direction is located between the second beam position and the third structure position,
a third support structure position in the second direction of the third support structure is located between the first support region position and the third structure position,
the third structure includes a third portion, a third other portion, and a third intermediate portion,
a direction from the third portion to the third other portion is along the third direction,
the third intermediate portion is provided between the third portion and the third other portion,
the third portion is connected to the second connection structure,
the third other portion is connected to the second movable region,
the third intermediate portion is connected to the third support structure,
the first member further includes a second structure and a second support structure,
a second structure position of the second structure in the second direction is located between the first movable region position and the first beam position,
a second support structure position of the second support structure in the second direction is located between the second structure position and the first support region position,
the second structure includes a second portion, a second other portion, and a second intermediate portion,
a direction from the second other portion to the second portion is along the third direction,
the second intermediate portion is provided between the second other portion and the second portion,
the second portion is connected to the first connection structure,
the second other portion is connected to the first movable region,
the second intermediate portion is connected to the second support structure, and
in the third direction, the first connection structure is provided between at least a part of the second support structure and at least a part of the first support structure.

(Configuration 13)

The sensor according to Configuration 12, wherein
the first member includes a fourth structure and a fourth support structure,
a fourth structure position in the second direction of the fourth structure is located between the second beam position and the second movable region position,
a fourth support structure position in the second direction of the fourth support structure is located between the first support region position and the fourth structure position,
the fourth structure includes a fourth portion, a fourth other portion, and a fourth intermediate portion,
a direction from the fourth other portion to the fourth portion is along the third direction,
the fourth intermediate portion is provided between the fourth other portion and the fourth portion,
the fourth portion is connected to the second connection structure,
the fourth other portion is connected to the second movable region,
the fourth intermediate portion is connected to the fourth support structure, and
in the third direction, the second connection structure is provided between at least a part of the fourth support structure and at least a part of the third support structure.

(Configuration 14)

The sensor according to Configuration 13, further comprising:
a first electrode fixed to the base; and
a first counter electrode fixed to the base,
the first electrode facing first beam electrode, and
the first counter electrode facing the first counter beam electrode.

(Configuration 15)

The sensor according to Configuration 14, further comprising:
a controller,
the controller being configured to apply a driving signal including an AC component between the first electrode and the first beam electrode, and
the controller being configured to detect an electrical signal generated between the first counter electrode and the first counter beam electrode.

(Configuration 16)

The sensor according to any one of Configurations 1-15, wherein
the first beam electrode includes:
a first extending portion extending in the second direction, and
a first connecting portion connecting the first extending portion to the first beam.

(Configuration 17)

The sensor according to Configuration 16, wherein
a plurality of the first extending portions are provided,
the first connecting portion connects the plurality of first extending portions to each other,
one of the plurality of first extending portions is provided between the first beam and another one of the plurality of first extending portions, and
a length of the one of the plurality of first extending portions along the second direction is longer than a length of the other one of the plurality of first extending portions along the second direction.

(Configuration 18)

The sensor according to any one of Configurations 1-17, wherein
a first outline of a first planar shape of the first beam electrode in a first plane including the second direction and the third direction is substantially same as a second outline of a second planar shape of the second beam electrode in the first plane.

(Configuration 19)

The sensor according to Configuration 2, wherein
the first counter beam electrode is linearly symmetrical to the first beam electrode with respect to an axis passing through the first connection structure and the second connection structure and along the second direction.

(Configuration 20)
An electronic device comprising:
the sensor according to any one of Configurations 1-19; and
a circuit controller configured to control a circuit based on a signal obtained from the sensor.

(Configuration 21)
A sensor, comprising:
a base;
a first support portion fixed to the base;
a second support portion fixed to the base;
a third support portion fixed to the base; and
a first member supported by the first support portion, the second support portion and the third support portion,
a gap being provided between the base and the first member,
the first member including a first beam, a second beam, a first beam electrode, and a second beam electrode,
the first beam and the second beam extending along a second direction crossing a first direction from the base to the first support portion,
the first support portion being between the second support portion and the third support portion in the second direction,
the first beam being supported by the second support portion and the first support portion,
the second beam being supported by the first support portion and the third support portion,
the first beam electrode being connected to the first beam,
a third direction from the first beam to the first beam electrode crossing a plane including the first direction and the second direction,
the second beam electrode being connected to the second beam,
a direction from the second beam to the second beam electrode being along the third direction,
the first beam electrode and the second beam electrode satisfying at least one of a first condition, a second condition, a third condition, a fourth condition, a fifth condition, a sixth condition, a seventh condition or an eighth condition,
in the first condition, the second mass of the second beam electrode being different from the first mass of the first beam electrode,
in the second condition, a second thickness of the second beam electrode along the first direction being different from a first thickness of the first beam electrode along the first direction,
in the third condition, at least a part of the second material included in the second beam electrode being different from at least a part of the first material included in the first beam electrode,
in the fourth condition, a second size of a second hole included in the second beam electrode being different from a first size of a first hole included in the first beam electrode,
in the fifth condition, a second density of the second holes being different from a first density of the first holes,
in the sixth condition, a second number of the second holes being different from a first number of the first holes,
in the seventh condition, a second shape of the second hole being different from a first shape of the first hole, and
in the eighth condition, a second layer configuration of the second beam electrode being different from a first layer configuration of the first beam electrode.

(Configuration 22)
The sensor according to Configuration 21, wherein
the first member further includes a first support region, a second support region, a third support region, a first movable region, a second movable region, a first connection structure, and a second connection structure,
the first support portion is provided between the base and the first support region in the first direction,
the second support portion is provided between the base and the second support region in the first direction,
the third support portion is provided between the base and the third support region in the first direction,
the first support region is supported by the first support portion,
the second support region is supported by the second support portion,
the third support region is supported by the third support portion,
in the second direction, the second support region is provided between the first movable region and the first beam,
in the second direction, the first support region is provided between the first beam and the second beam,
in the second direction, the third support region is provided between the second beam and the second movable region,
the first connection structure is supported by the second support region,
the first beam is supported by the first connection structure and the first support region,
the second connection structure is supported by the third support region, and
the second beam is supported by the first support region and the second connection structure.

(Configuration 23)
The sensor according to Configuration 22, further comprising:
a first electrode fixed to the base; and
a first counter electrode fixed to the base,
the first member further including a first counter beam electrode connected to the first beam, and
in the third direction, the first beam being provided between the first counter beam electrode and the first beam electrode,
the first electrode facing the first beam electrode, and
the first counter electrode facing the first counter beam electrode.

(Configuration 24)
The sensor according to Configuration 23, further comprising:
a controller,
the controller being configured to apply a drive signal including an AC component between the first electrode and the first beam electrode, and
the controller being configured to detect an electrical signal generated between the first counter electrode and the first counter beam electrode.

(Configuration 25)
The sensor according to Configuration 22, wherein
the first member includes a first counter beam electrode and a second counter beam electrode,
the first counter beam electrode is connected to the first beam,
in the third direction, the first beam is provided between the first counter beam electrode and the first beam electrode, the second counter beam electrode is connected to the second beam, in the third direction, the second beam is provided between the second counter beam electrode and the second beam electrode, the first counter beam electrode and the second counter beam electrode satisfy at least one of a ninth condition, a tenth condition, an eleventh condition, a twelfth condition, a thirteenth condition, a fourteenth condition, a fifteenth condition or the sixteenth condition, in the ninth condition, a second counter mass of the second counter beam electrode is different from a first counter mass of the first counter beam electrode, in the tenth condition, a second counter thickness of the second counter beam electrode along the first direction is different from a first counter thickness of the first counter beam electrode along the first direction, in the eleventh condition, at least a part of a second counter material included in the second facing beam electrode is different from at least a part of a first counter material included in the first facing beam electrode, in the twelfth condition, a second counter size of a second counter hole included in the second counter beam electrode is different from a first counter size of a first counter hole included in the first counter beam electrode, in the thirteenth condition, a second counter density of the second facing holes is different from a first counter density of the first facing holes, in the fourteenth condition, a second counter number of the second counter holes is different from a first counter number of the first counter holes, in the fifteenth condition, a second counter shape of the second counter hole is different from the first counter shape of the first facing hole, and in the sixteenth condition, a second counter layer configuration of the second counter beam electrode is different from the first counter layer configuration of the first counter beam electrode.

(Configuration 26)

The sensor according to Configuration 25, wherein the first member further includes a third movable region and a first structure, the first beam electrode is provided between the first beam and the third movable region in the third direction, the first structure includes a first portion, a first other portion and a first intermediate portion, a direction from the first portion to the first other portion is along the third direction, the first intermediate portion is provided between the first portion and the first other portion, the first portion is connected to the first connection structure, the first other portion is connected to the third movable region, the first intermediate portion is connected to the third support region, the first member further includes a third structure, the third structure includes a third portion, a third other portion and a third intermediate portion, a direction from the third portion to the third other portion is along the third direction, the third intermediate portion is provided between the third portion and the third other portion, the third portion is connected to the second connection structure, the third other portion is connected to the third movable region, the third intermediate portion is connected to the third support region, the first member further includes a fourth movable region and a second structure, the first counter beam electrode is provided between the fourth movable region and the first beam in the third direction, the second structure includes a second portion, a second other portion and a second intermediate portion;

a direction from the second other portion to the second portion is along the third direction, the second intermediate portion is provided between the second other portion and the second portion, the second portion is connected to the first connection structure, the second other portion is connected to the fourth movable region, the second intermediate portion is connected to the second support region, the first member further includes a fourth structure, the fourth structure includes a fourth portion, a fourth other portion and a fourth intermediate portion, a direction from the fourth other portion to the fourth portion is along the third direction, the fourth intermediate portion is provided between the fourth other portion and the fourth portion, the fourth portion is connected to the second connection structure, the fourth other portion is connected to the fourth movable region, and the fourth intermediate portion is connected to the third support region.

(Configuration 27)

The sensor according to Configuration 26, wherein the first member further includes a first support structure, a second support structure, a third support structure and a fourth support structure, the first support structure and the second support structure are connected to the second support region, the second support region is provided between the first support structure and the second support structure in the third direction, the first movable region is supported by the first support structure and the second support structure, the third support structure and the fourth support structure are connected to the third support region, the third support region is provided between the third support structure and the fourth support structure in the third direction, and the second movable region is supported by the third support structure and the fourth support structure.

(Configuration 28)

The sensor according to Configuration 21, wherein the first member further includes a first counter beam, a second counter beam, a first counter beam electrode and a second counter beam electrode, the first counter beam and the second counter beam extend along the second direction, the first counter beam is supported by the second support portion and the first support portion, the second counter beam is supported by the first support portion and the third support portion, the first counter beam electrode is connected to the first counter beam, a direction from the first counter beam electrode to the first counter beam is along the third direction, the second counter beam electrode is connected to the second counter beam, and a direction from the second counter beam electrode to the second counter beam is along the third direction.

(Configuration 29)

The sensor according to any one of Configurations 21-28, wherein the first beam electrode includes:
  a first extending portion extending along the second direction, and
  a first connecting portion connecting the first extending portion to the first beam.

(Configuration 30)

The sensor according to Configuration 29, wherein
a plurality of the first extending portions are provided,
the first connecting portion connects the plurality of first extending portions to each other,
one of the plurality of first extending portions is provided between the first beam and another one of the plurality of first extending portions, and a length of the one of the plurality of first extending portions along the second direction is longer than a length of the other one of the plurality of first extending portions along the second direction.

(Configuration 31)

An electronic device, comprising:
the sensor according to any one of Configurations 21-30; and
a circuit controller configured to control a circuit based on a signal obtained from the sensor.

Figure 15:
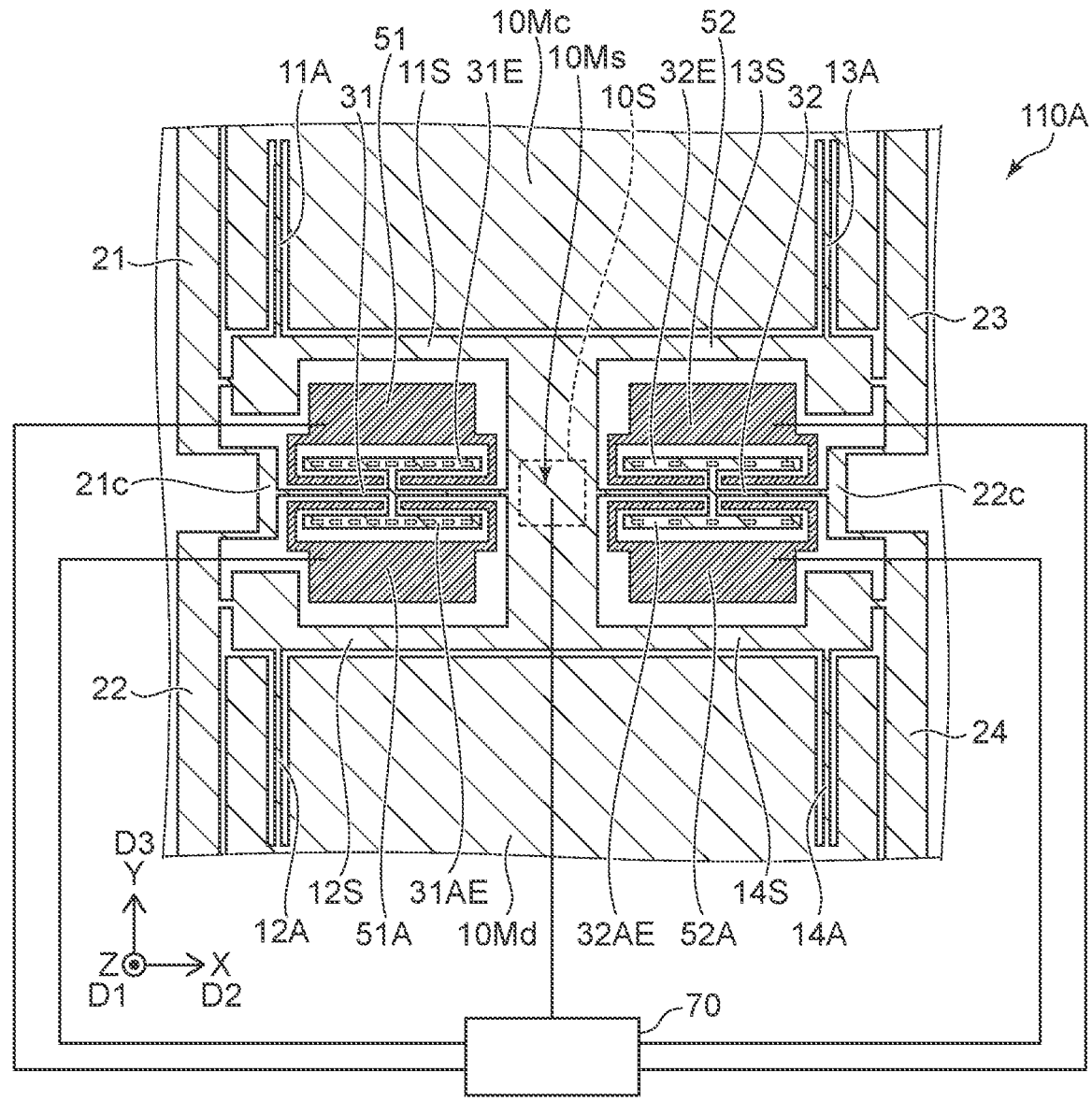
FIG. 15 is a schematic plan view illustrating the sensor according to the first embodiment.

FIG. 15 is a schematic plan view illustrating the sensor according to the first embodiment.

As shown in FIG. 15, in a sensor 110A according to the embodiment, at least a part of the first electrode 51 is provided between the first beam 31 and the first beam electrode 31E in the third direction D3. At least a part of the second electrode 52 is provided between the second beam 32 and the second beam electrode 32E in the third direction D3. At least a part of the first counter electrode 51A is provided between the first beam 31 and the first counter beam electrode 31AE in the third direction D3. At least a part of the second counter electrode 52A is provided between the second beam 32 and the second counter beam electrode 32AE in the third direction D3. The configuration of the sensor 110A other than this may be the same as the configuration of the sensor 110.

For example, in the sensor 120 (see FIG. 10), at least a part of the first electrode 51 may be provided between the first beam 31 and the first beam electrode 31E in the third direction D3. At least a part of the second electrode 52 may be provided between the second beam 32 and the second beam electrode 32E in the third direction D3. At least a part of the first counter electrode 51A may be provided between the first beam 31 and the first counter beam electrode 31AE in the third direction D3. At least a part of the second counter electrode 52A may be provided between the second beam 32 and the second counter beam electrode 32AE in the third direction D3.

Figure 16:
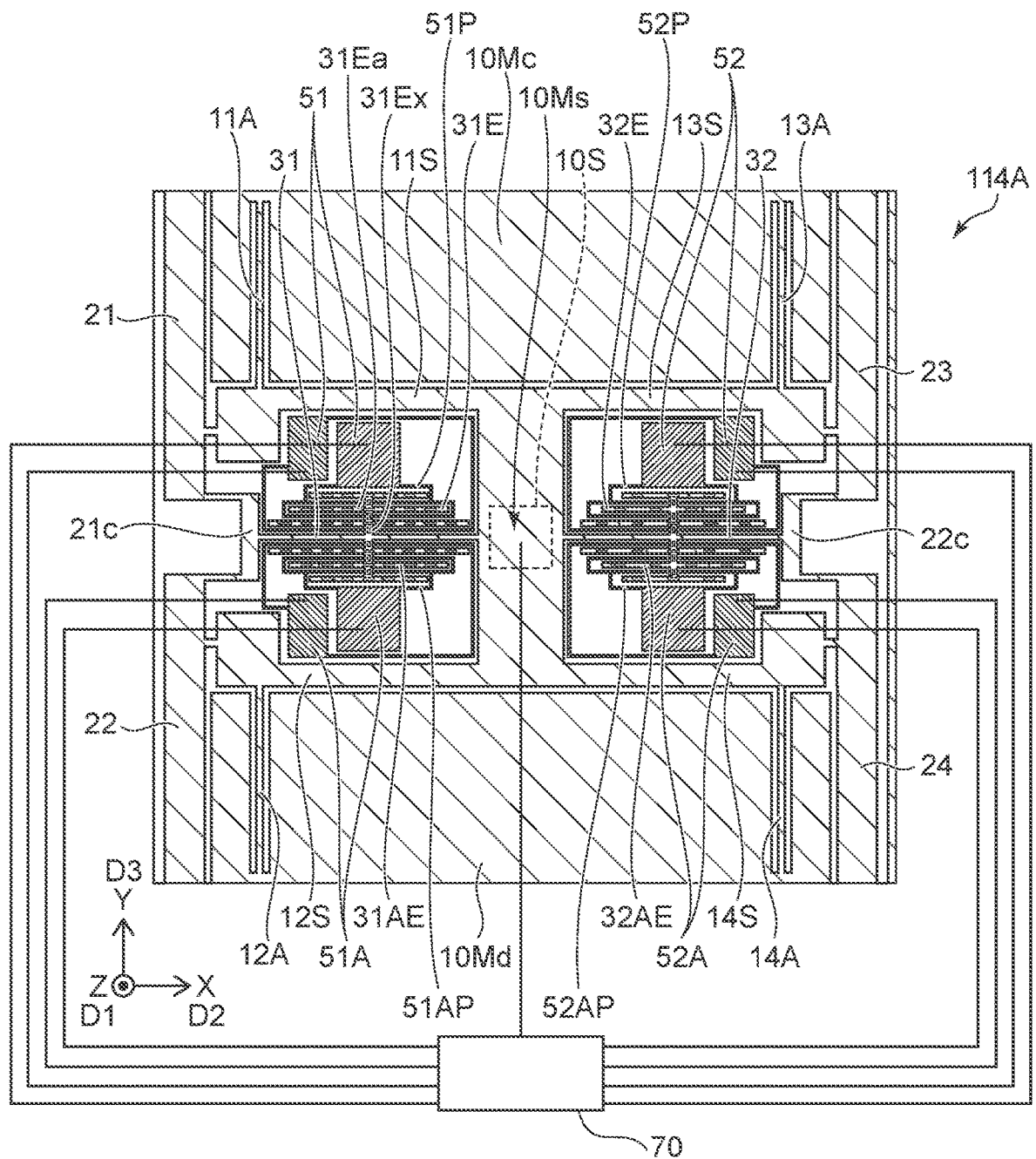
FIG. 16 is a schematic plan view illustrating the sensor according to the first embodiment.

FIG. 16 is a schematic plan view illustrating the sensor according to the first embodiment.

As shown in FIG. 16, in a sensor 114A according to the embodiment, a first extending electrode 51P, a second extending electrode 52P, a first counter extending electrode 51AP, and a second counter extending electrode 52AP is provided. Except for this, the configuration of the sensor 114A may be the same as the configuration of the sensor 114.

At least a part of the first extending electrode 51P is provided between the plurality of portions (the plurality of first extending portions 31Ea) included in the first beam electrode 31E in the third direction D3. At least a part of the second extending electrode 52P is provided between the plurality of portions included in the second beam electrode 32E in the third direction D3. At least a part of the first counter extending electrode 51AP is provided between the plurality of portions included in the first counter beam electrode 31AE in the third direction D3. At least a part of the second counter extending electrode 52AP is provided between the plurality of portions included in the second counter beam electrode 32AE in the third direction D3.

Each of the first extending electrode 51P, the second extending electrode 52P, the first counter extending electrode 51AP, and the second counter extending electrode 52AP may be electrically connected to the controller 70.

Third Embodiment

Figure 17:
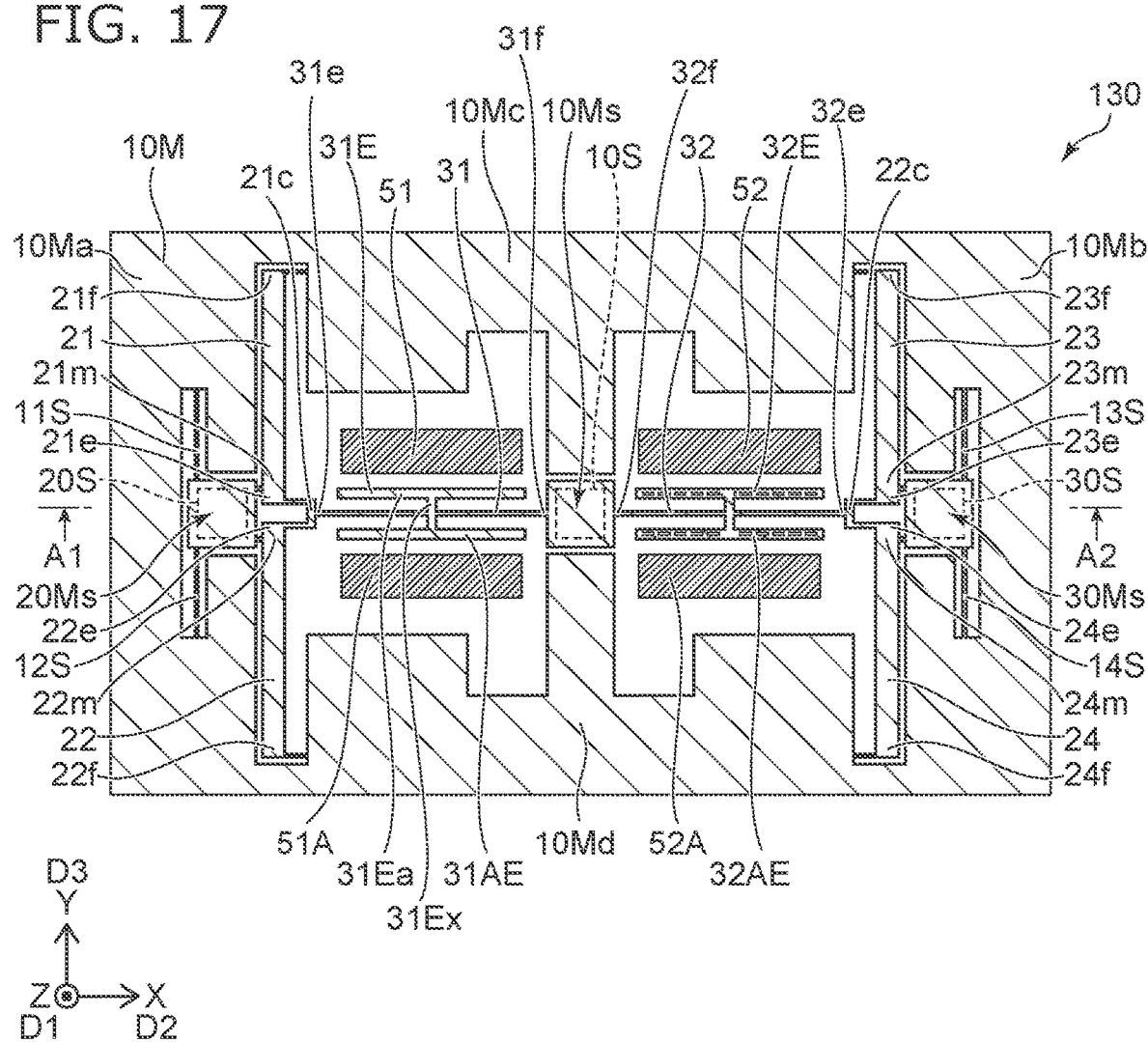
FIG. 17 is a schematic plan view illustrating a sensor according to a third embodiment.

FIG. 17 is a schematic plan view illustrating a sensor according to a third embodiment.

Figure 18:
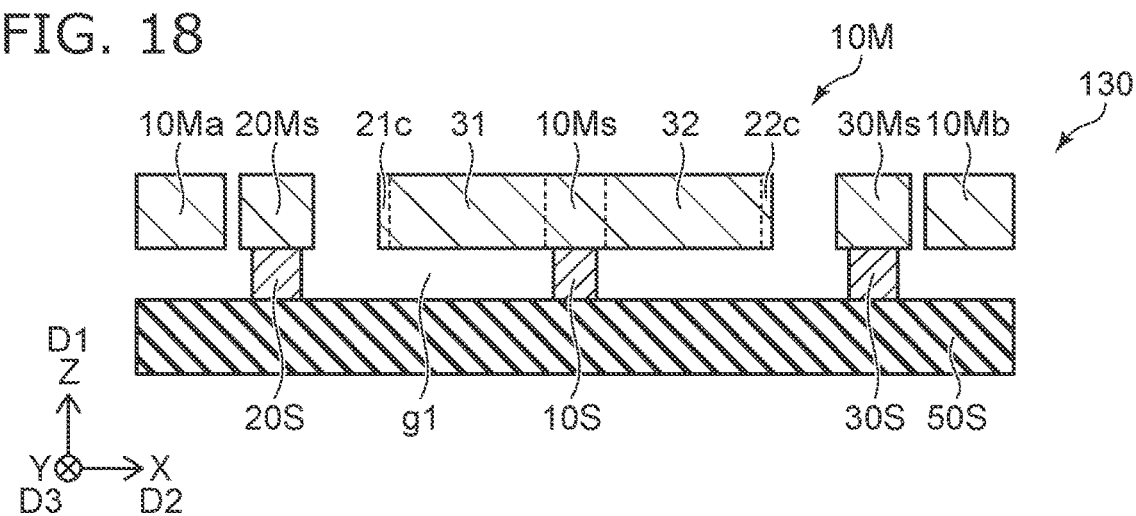
FIG. 18 is a schematic cross-sectional view illustrating the sensor according to the third embodiment.

FIG. 18 is a schematic cross-sectional view illustrating the sensor according to the third embodiment.

FIG. 18 is a cross-sectional view taken along the line A1-A2 of FIG. 17.

As shown in FIG. 17 and FIG. 18, a sensor 130 according to the embodiment includes a base 50S, a first support portion 10S, a second support portion 20S, a third support portion 30S, and a first member 10M. The first support portion 10S, the second support portion 20S and the third support portion 30S are fixed to the base 50S. The first member 10M is supported by the first support portion 10S, the second support portion 20S and the third support portion 30S. A gap g1 is provided between the base 50S and the first member 10M.

As shown in FIG. 17, the first member 10M includes a first beam 31, a second beam 32, a first beam electrode 31E and a second beam electrode 32E.

The first beam 31 and the second beam 32 extend along the second direction D2. The second direction D2 crosses the first direction D1 from the base 50S to the first support portion 10S.

The first support portion 10S is provided between the second support portion 20S and the third support portion 30S in the second direction D2. The first beam 31 is supported by the second support portion 20S and the first support portion 10S. The second beam 32 is supported by the first support portion 10S and the third support portion 30S.

The first beam electrode 31E is connected to the first beam 31. A third direction D3 from the first beam 31 to the first beam electrode 31E crosses a plane including the first direction D1 and the second direction D2. The second beam electrode 32E is connected to the second beam 32. The direction from the second beam 32 to the second beam electrode 32E is along the third direction D3.

The first beam electrode 31E and the second beam electrode 32E satisfy at least one of the above mentioned, the first condition, the second condition, the third condition, the fourth condition, the fifth condition, the sixth condition, the seventh condition, or the eighth condition.

In the sensor 130, this causes a difference in resonance frequency between the first beam 31 and the second beam 32, for example. This increases the dynamic range of detection. A sensor capable of improving characteristics can be provided.

As shown in FIG. 17, in the sensor 130, the first member 10M may further includes the first support region 10Ms, the second support region 20Ms, the third support region 30Ms, the first movable region 10Ma, the second movable region 10Mb, the first connection structure 21c and the second connection structure 22c.

The first support portion 10S is provided between the base 50S and the first support region 10Ms in the first direction D1. The second support portion 20S is provided between base 50S and the second support region 20Ms in the first direction D1. The third support portion 30S is provided between the base 50S and the third support region 30Ms in the first direction D1. The first support region 10Ms is supported by the first support portion 10S. The second support region 20Ms is supported by the second support portion 20S. The third support region 30Ms is supported by the third support portion 30S.

The first connection structure 21c is supported by the second support region 20Ms. The first beam 31 is supported by the first connection structure 21c and the first support region 10Ms. The second connection structure 22c is supported by the third support region 30Ms. The second beam 32 is supported by the first support region 10Ms and the second connection structure 22c.

The sensor 130 may include the first electrode 51 and the first counter electrode 51A. The first electrode 51 and the first counter electrode 51A are fixed to the base 50S.

The first member 10M includes the first counter beam electrode 31AE. The first counter beam electrode 31AE is connected to the first beam 31. In the third direction D3, the first beam 31 is provided between the first counter beam electrode 31AE and the first beam electrode 31E. The first electrode 51 faces the first beam electrode 31E. The first counter electrode 51A faces the first counter beam electrode 31AE.

The sensor 130 may include the controller 70 (see FIG. 3). The controller 70 is configured to a drive signal including the AC component between the first electrode 51 and the first beam electrode 31E. For example, the controller 70 is configured to detect the electrical signal generated between the first counter electrode 51A and the first counter beam electrode 31AE.

The first member 10M may include the first counter beam electrode 31AE and the second counter beam electrode 32AE. The first counter beam electrode 31AE is connected to the first beam 31. In the third direction D3, the first beam 31 is provided between the first counter beam electrode 31AE and the first beam electrode 31E. The second counter beam electrode 32AE is connected to the second beam 32. In the third direction D3, the second beam 32 is provided between the second counter beam electrode 32AE and the second beam electrode 32E.

The first counter beam electrode 31AE and the second counter beam electrode 32AE satisfy at least one of the ninth condition, the tenth condition, the eleventh condition, the twelfth condition, the thirteenth condition, the fourteenth condition, the fifteenth condition or the sixteenth condition.

In the sensor 130, the first member 10M further includes the third movable region 10Mc and the first structure 21. The first beam electrode 31E is provided between the first beam 31 and the third movable region 10Mc in the third direction D3.

The first structure 21 includes the first portion 21e, the first other portion 21f and the first intermediate portion 21m. The direction from the first portion 21e to the first other portion 21f is along the third direction D3. The first intermediate portion 21m is provided between the first portion 21e and the first other portion 21f. The first portion 21e is connected to the first connection structure 21c. The first other portion 21f is connected to the third movable region 10Mc. The first intermediate portion 21m is connected to the second support region 20Ms.

The first member 10M may further include the third structure 23. The third structure 23 includes the third portion 23e, the third other portion 23f and the third intermediate portion 23m. The direction from the third portion 23e to the third other portion 23f is along the third direction D3. The third intermediate portion 23m is provided between the third portion 23e and the third other portion 23f. The third portion 23e is connected to the second connection structure 22c. The third other portion 23f is connected to the third movable region 10Mc. The third intermediate portion 23m is connected to the third support region 30Ms.

The first member 10M may further include the fourth movable region 10Md and the second structure 22. The first counter beam electrode 31AE is provided between the fourth movable region 10Md and the first beam 31 in the third direction D3.

The second structure 22 includes the second portion 22e, the second other portion 22f and the second intermediate portion 22m. The direction from the second other portion 22f to the second portion 22e is along the third direction D3. The second intermediate portion 22m is provided between the second other portion 22f and the second portion 22e. The second portion 22e is connected to the first connection structure 21c. The second other portion 22f is connected to the fourth movable region 10Md. The second intermediate portion 22m is connected to the second support region 20Ms.

The first member 10M may further include the fourth structure 24. The fourth structure 24 includes the fourth portion 24e, the fourth other portion 24f and the fourth intermediate portion 24m. The direction from the fourth other portion 24f to the fourth portion 24e is along the third direction D3. The fourth intermediate portion 24m is provided between the fourth other portion 24f and the fourth portion 24e. The fourth portion 24e is connected to the second connection structure 22c. The fourth other portion 24f is connected to the fourth movable region 10Md. The fourth intermediate portion 24m is connected to the third support region 30Ms.

As shown in FIG. 17, the first member 10M may further include a first support structure 11S, a second support structure 12S, a third support structure 13S and a fourth support structure 14S. The first support structure 11S and the second support structure 12S are connected to the second support region 20Ms. The second support region 20Ms is provided between the first support structure 11S and the second support structure 12S in the third direction D3. The first movable region 10Ma is supported by the first support structure 11S and the second support structure 12S.

The third support structure 13S and the fourth support structure 14S are connected to the third support region 30Ms. The third support region 30Ms is provided between the third support structure 13S and the fourth support structure 14S in the third direction D3. The second movable region 10Mb is supported by the third support structure 13S and the fourth support structure 14S.

As shown in FIG. 17, the first beam electrode 31E includes the first extending portion 31Ea and the first connecting portion 31Ex. The first extending portion 31Ea extends along the second direction D2. The first connecting portion 31Ex connects the first extending portion 31Ea to the first beam 31. The configuration of the first beam electrode 31E may be applied to the first counter beam electrode 31AE, the second beam electrode 32E, and the second counter beam electrode 32AE.

Figure 19:
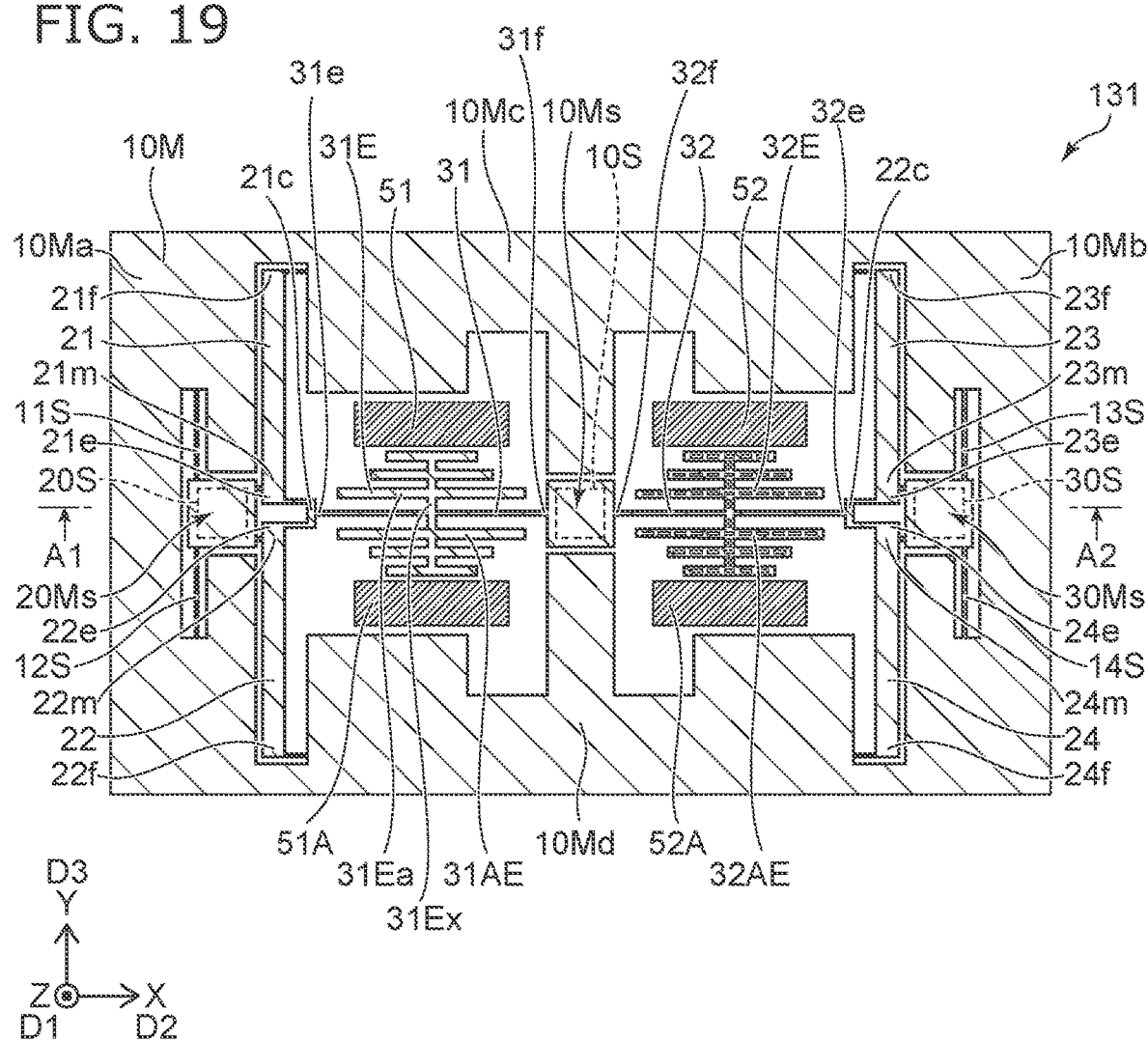
FIG. 19 is a schematic plan view illustrating the sensor according to the third embodiment.

FIG. 19 is a schematic plan view illustrating the sensor according to the third embodiment.

As shown in FIG. 19, in a sensor 131 according to the embodiment, a plurality of first extending portions 31Ea are provided. Except for this, the configuration of the sensor 131 may be the same as the configuration of the sensor 130.

The first connecting portion 31Ex connects the plurality of first extending portions 31Ea to each other. One of the plurality of first extending portions 31Ea is provided between the first beam 31 and another one of the plurality of first extending portions 31Ea. The length of the one of the first extending portions 31Ea along the second direction D2 is longer than the length of the other one of the first extending portions 31Ea along the second direction D2.

Figure 20:
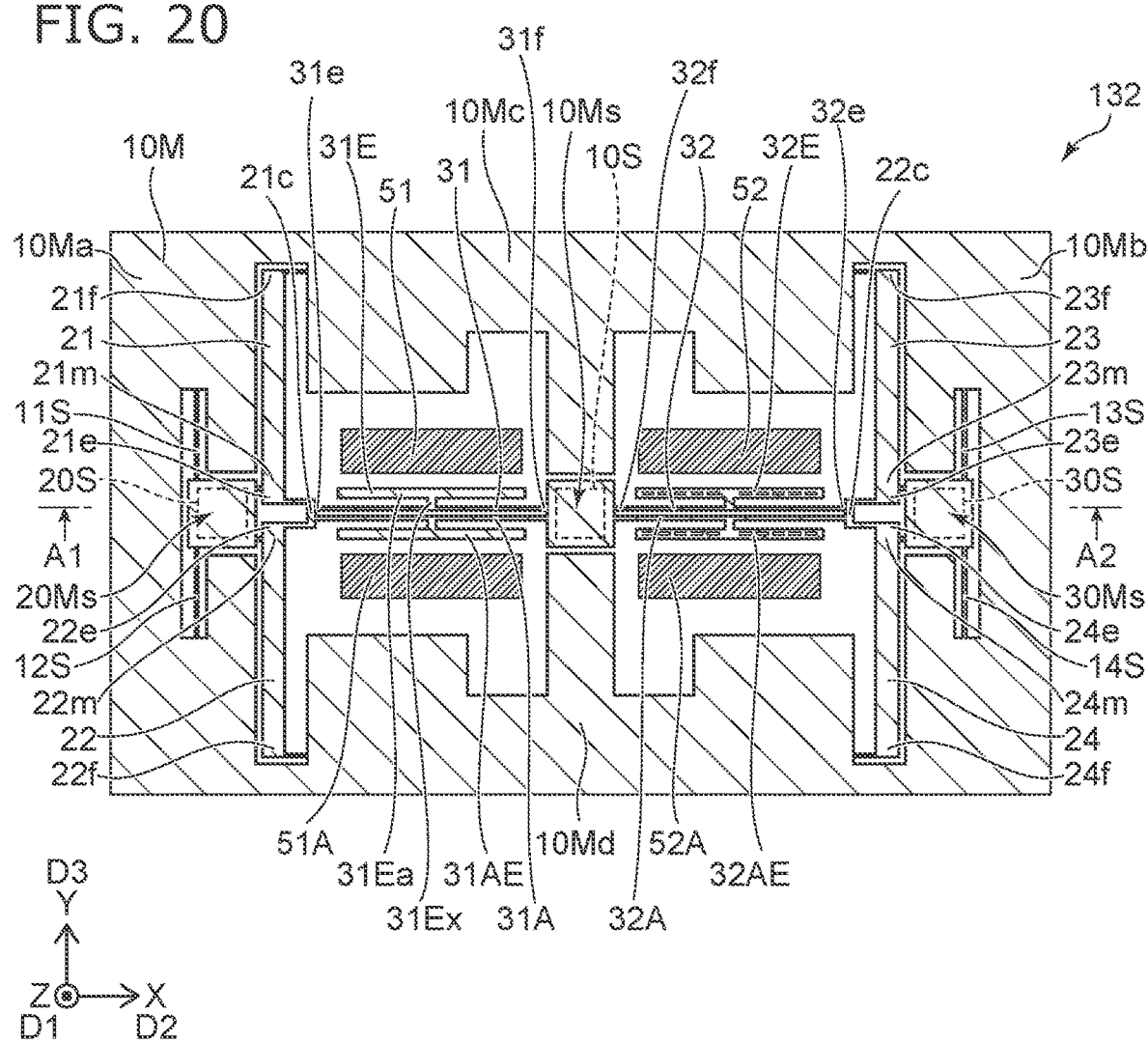
FIG. 20 is a schematic plan view illustrating the sensor according to the third embodiment.

FIG. 20 is a schematic plan view illustrating the sensor according to the third embodiment.

As shown in FIG. 20, in a sensor 132 according to the embodiment, the first member 10M further includes the first counter beam 31A, the second counter beam 32A, the first counter beam electrode 31AE and a second counter beam electrode 32AE. Except for this, the configuration of the sensor 132 may be the same as the configuration of the sensor 130.

The first counter beam 31A and the second counter beam 32A extend along the second direction D2. The first counter beam 31A is supported by the second support portion 20S (second support region 20Ms) and the first support portion 10S (first support region 10Ms). The second counter beam 32A is supported by the first support portion 10S (first support region 10Ms) and the third support portion 30S (third support region 30Ms).

The first counter beam electrode 31AE is connected to the first counter beam 31A. The direction from the first counter beam electrode 31AE to the first counter beam 31A is along the third direction D3. The second counter beam electrode 32AE is connected to the second counter beam 32A. The direction from the second counter beam electrode 32AE to the second counter beam 32A is along the third direction D3.

Figure 21:
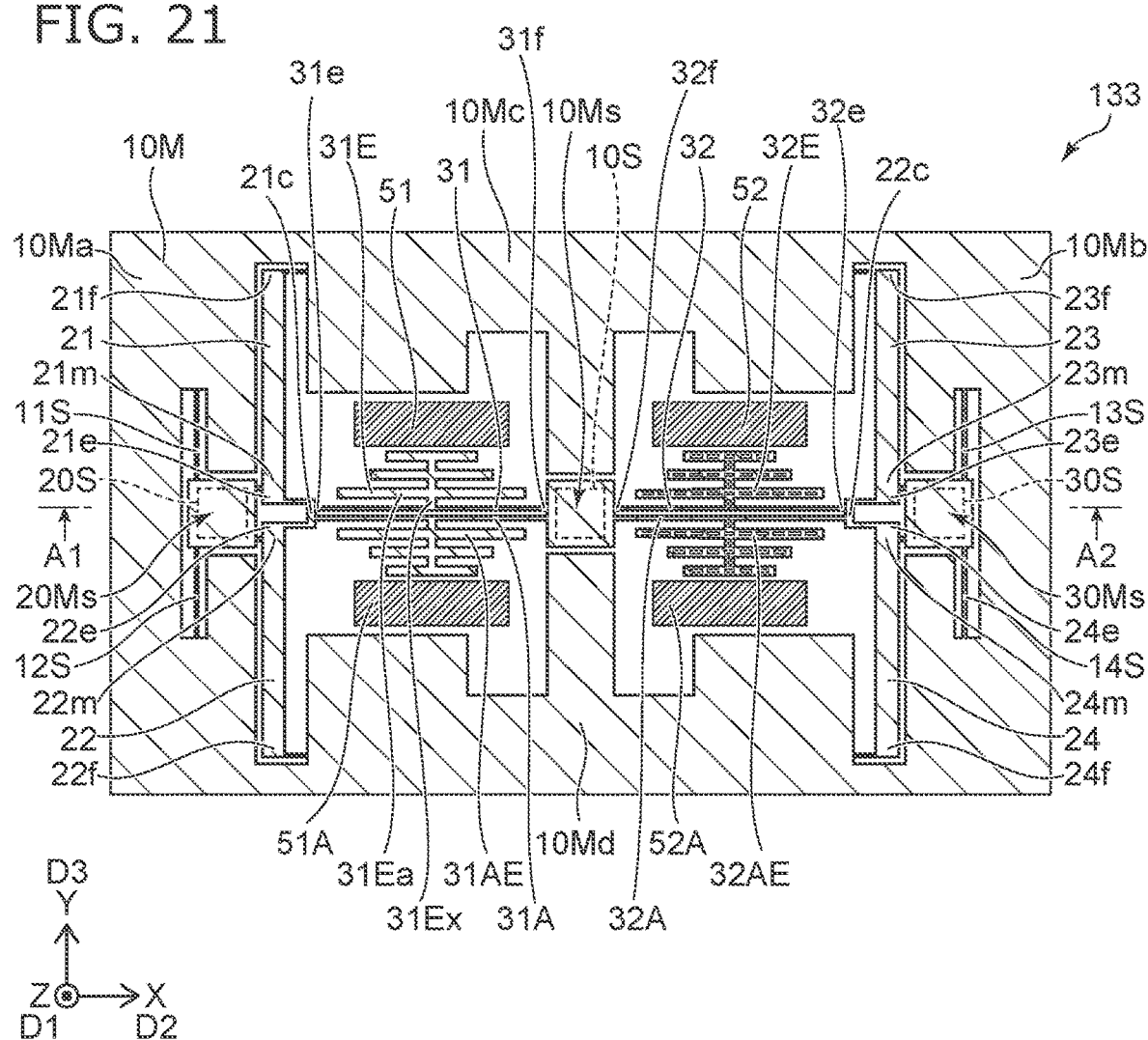
FIG. 21 is a schematic plan view illustrating the sensor according to the third embodiment.

FIG. 21 is a schematic plan view illustrating the sensor according to the third embodiment.

As shown in FIG. 21, in a sensor 133 according to the embodiment, the plurality of first extending portions 31Ea are provided. Except for this, the configuration of the sensor 133 may be the same as the configuration of the sensor 132.

The sensors 131 to 133 can also provide sensors whose characteristics can be improved. The sensors 130-133 may be applied to electronic device 310 (FIG. 12).

In the embodiment, the first layer configuration may be the layer configuration of the first hole 31h. The second layer configuration may be the layer configuration of the second hole 32h. The first counter layer configuration may be the layer configuration of the first counter hole 31Ah. The second counter layer configuration may be the layer configuration of the second counter hole 32Ah.

According to the embodiments, a sensor and an electronic devices capable of improving characteristics are provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as bases, support portions, first members, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and electronic devices practicable by an appropriate design modification by one skilled in the art based on the sensors and the electronic devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
   a base;
   a first support portion fixed to the base; and
   a first member supported by the first support portion,
   a gap being provided between the base and the first member,
   the first member including a first support region, a first connection structure, a second connection structure, a first beam, a second beam, a first beam electrode, and a second beam electrode,
   the first support portion being provided between the base and the first support region in a first direction from the base to the first support portion,
   the first support region being supported by the first support portion,
   the first beam and the second beam extending along a second direction crossing the first direction,
   a direction from the first connection structure to the second connection structure being along the second direction,
   the first support region being provided between the first connection structure and the second connection structure in the second direction,
   the first beam including a first end and a first other end, the first end being connected to the first connection structure, the first other end being connected to the first support region,
   the second beam including a second end and a second other end, the second end being connected to the second connection structure, the second other end being connected to the first support region,
   the first beam electrode being connected to the first beam,
   a direction from the first beam to the first beam electrode being along a third direction crossing a plane including the first direction and the second direction, the second beam electrode being connected to the second beam, a direction from the second beam to the second beam electrode being along the third direction;

the first beam electrode having a first mass, a first thickness along the first direction, and a first layer configuration, the first beam electrode including a first material and a plurality of first holes each having a first size and a first shape, the first holes in the first beam having a first density and a first number, the second beam electrode having a second mass, a second thickness along the first direction, and a second layer configuration, the second beam electrode including a second material and a plurality of second holes each having a second size and a second shape, the second holes in the second beam having a second density and a second number, the first beam electrode and the second beam electrode are configured to satisfy at least one of a first condition, a second condition, a third condition, a fourth condition, a fifth condition, a sixth condition, a seventh condition, or an eighth condition, in the first condition, the second mass of the second beam electrode being different from the first mass of the first beam electrode, in the second condition, the second thickness along the first direction of the second beam electrode being different from the first thickness along the first direction of the first beam electrode, in the third condition, at least a part of the second material included in the second beam electrode being different from at least a part of the first material included in the first beam electrode, in the fourth condition, the second size of the second holes included in the second beam electrode being different from the first size of the first holes included in the first beam electrode, in the fifth condition, the second density of the second holes being different from the first density of the first holes, in the sixth condition, the second number of the second holes being different from the first number of the first holes, in the seventh condition, the second shape of the second holes being different from the first shape of the first holes, and in the eighth condition, the second layer configuration of the second beam electrode being different from the first layer configuration of the first beam electrode, wherein the first member further includes a first movable region and a second movable region, in the second direction, the first support region is provided between the first movable region and the second movable region, the first connection structure is supported by the first movable region, the first connection structure is provided between the first movable region and the first support region in the second direction, the second connection structure is supported by the second movable region, and the second connection structure is provided between the first support region and the second movable region in the second direction, the first member includes a first counter beam electrode and a second counter beam electrode, the first counter beam electrode is connected to the first beam, in the third direction, the first beam is provided between the first counter beam electrode and the first beam electrode, the second counter beam electrode is connected to the second beam, in the third direction, the second beam is provided between the second counter beam electrode and the second beam electrode, the first counter beam electrode having a first counter mass, a first counter thickness along the first direction, and a first counter layer configuration, the first counter beam electrode including a first counter material and a plurality of first counter holes each having a first counter size and a first counter shape, the first counter holes having a first counter density and a first counter number, the second counter beam electrode having a second counter mass, a second counter thickness along the first direction, and a second counter layer configuration, the second counter beam electrode including a second counter material and a plurality of second counter holes each having a second counter size and a second counter shape, the second counter holes having a second counter density and a second counter number, the first counter beam electrode and the second counter beam electrode are configured to satisfy at least one of a ninth condition, a tenth condition, an eleventh condition, a twelfth condition, a thirteenth condition, a fourteenth condition, a fifteenth condition, or a sixteenth condition, in the ninth condition, the second counter mass of the second counter beam electrode is different from the first counter mass of the first counter beam electrode, in the tenth condition, the second counter thickness along the first direction of the second counter beam electrode is different from the first counter thickness along the first direction of the first counter beam electrode, in the eleventh condition, at least a part of the second counter material included in the second counter beam electrode is different from at least a part of the first counter material included in the first counter beam electrode, in the twelfth condition, the second counter size of the second counter holes included in the second counter beam electrode is different from the first counter size of the first counter holes included in the first counter beam electrode, in the thirteenth condition, the second counter density of the second counter holes is different from the first counter density of the first counter holes, in the fourteenth condition, the second counter number of the second counter holes is different from the first counter number of the first counter holes, in the fifteenth condition, the second counter shape of the second counter hole is different from a first counter shape of the first counter hole, and in the sixteenth condition, the second counter layer configuration of the second counter beam electrode is different from the first counter layer configuration of the first counter beam electrode, the first member further includes a first structure and a first support structure, a first structure position of the first structure in the second direction is located between a first movable region position of the first movable region in the second direction and a first beam position of the first beam in the second direction, a first connection structure position of the first connection structure in the second direction is located between the first structure position and the first beam position, a first support structure position of the first support structure in the second direction is located between the first structure position and a first support region position of the first support region in the second direction, the first structure includes a first portion, a first other portion, and a first intermediate portion, a direction from the first portion to the first other portion is along the third direction, the first intermediate portion is provided between the first portion and the first other portion, the first portion is connected to the first connection structure, the first other portion is connected to the first movable region, and the first intermediate portion is connected to the first support structure.

2. The sensor according to claim 1, further comprising:
a first electrode fixed to the base; and
a first counter electrode fixed to the base,
the first member further including a first counter beam electrode connected to the first beam,
in the third direction, the first beam being provided between the first counter beam electrode and the first beam electrode,
the first electrode facing the first beam electrode, and
the first counter electrode facing the first counter beam electrode.

3. The sensor according to claim 2, further comprising:
a controller,
the controller being configured to apply a drive signal including an AC component between the first electrode and the first beam electrode, and
the controller being configured to detect an electrical signal generated between the first counter electrode and the first counter beam electrode.

4. The sensor according to claim 1, wherein
the first member further includes a third structure and a third support structure, a third structure position of the third structure in the second direction is located between a second beam position of the second beam in the second direction and a second movable region position of the second movable region in the second direction, a second connection structure position of the second connection structure in the second direction is located between the second beam position and the third structure position, and a third support structure position in the second direction of the third support structure is located between the first support region position and the third structure position, the third structure includes a third portion, a third other portion, and a third intermediate portion, a direction from the third portion to the third other portion is along the third direction, the third intermediate portion is provided between the third portion and the third other portion;

the third portion is connected to the second connection structure, the third other portion is connected to the second movable region, and the third intermediate portion is connected to the third support structure.

5. The sensor according to claim 4, wherein
the first member further includes a second structure and a second support structure, a second structure position of the second structure in the second direction is located between the first movable region position and the first beam position, a second support structure position of the second support structure in the second direction is located between the second structure position and the first support region position, the second structure includes a second portion, a second other portion, and a second intermediate portion, a direction from the second other portion to the second portion is along the third direction, the second intermediate portion is provided between the second other portion and the second portion, the second portion is connected to the first connection structure, the second other portion is connected to the first movable region, the second intermediate portion is connected to the second support structure, and in the third direction, the first connection structure is provided between at least a part of the second support structure and at least a part of the first support structure.

6. The sensor according to claim 5, wherein
the first member includes a fourth structure and a fourth support structure, a fourth structure position in the second direction of the fourth structure is located between the second beam position and the second movable region position, a fourth support structure position in the second direction of the fourth support structure is located between the first support region position and the fourth structure position, the fourth structure includes a fourth portion, a fourth other portion, and a fourth intermediate portion;

a direction from the fourth other portion to the fourth portion is along the third direction, a fourth intermediate portion is provided between the fourth other portion and the fourth portion, the fourth portion is connected to the second connection structure, the fourth other portion is connected to the second movable region, the fourth intermediate portion is connected to the fourth support structure, and in the third direction, the second connection structure is provided between at least a part of the fourth support structure and at least a part of the third support structure.

7. The sensor according to claim 1, wherein
the first beam electrode includes:
a first extending portion extending in the second direction, and
a first connecting portion connecting the first extending portion to the first beam.

8. An electronic device, comprising:
the sensor according to claim 1; and
a circuit controller configured to control a circuit based on a signal obtained from the sensor.

9. A sensor, comprising:
a base;
a first support portion fixed to the base; and
a first member supported by the first support portion,
a gap being provided between the base and the first member,
the first member including a first support region, a first connection structure, a second connection structure, a first beam, a second beam, a first beam electrode, and a second beam electrode,
the first support portion being provided between the base and the first support region in a first direction from the base to the first support portion,
the first support region being supported by the first support portion,
the first beam and the second beam extending along a second direction crossing the first direction,
a direction from the first connection structure to the second connection structure being along the second direction,
the first support region being provided between the first connection structure and the second connection structure in the second direction,
the first beam including a first end and a first other end, the first end being connected to the first connection structure, the first other end being connected to the first support region,
the second beam including a second end and a second other end, the second end being connected to the second connection structure, the second other end being connected to the first support region,
the first beam electrode being connected to the first beam,
a direction from the first beam to the first beam electrode being along a third direction crossing a plane including the first direction and the second direction,
the second beam electrode being connected to the second beam,
a direction from the second beam to the second beam electrode being along the third direction;
the first beam electrode having a first mass, a first thickness along the first direction, and a first layer configuration,
the first beam electrode including a first material and a plurality of first holes each having a first size and a first shape,
the first holes in the first beam having a first density and a first number,
the second beam electrode having a second mass, a second thickness along the first direction, and a second layer configuration,
the second beam electrode including a second material and a plurality of second holes each having a second size and a second shape,
the second holes in the second beam having a second density and a second number,
the first beam electrode and the second beam electrode are configured to satisfy at least one of a first condition, a second condition, a third condition, a fourth condition, a fifth condition, a sixth condition, a seventh condition, or an eighth condition,
in the first condition, the second mass of the second beam electrode being different from the first mass of the first beam electrode,
in the second condition, the second thickness along the first direction of the second beam electrode being different from the first thickness along the first direction of the first beam electrode,
in the third condition, at least a part of the second material included in the second beam electrode being different from at least a part of the first material included in the first beam electrode,
in the fourth condition, the second size of the second holes included in the second beam electrode being different from the first size of the first holes included in the first beam electrode,
in the fifth condition, the second density of the second holes being different from the first density of the first holes,
in the sixth condition, the second number of the second holes being different from the first number of the first holes,
in the seventh condition, the second shape of the second holes being different from the first shape of the first holes, and
in the eighth condition, the second layer configuration of the second beam electrode being different from the first layer configuration of the first beam electrode,
wherein
the first member further includes a first movable region and a second movable region,
in the second direction, the first support region is provided between the first movable region and the second movable region,
the first connection structure is supported by the first movable region,
the first connection structure is provided between the first movable region and the first support region in the second direction,
the second connection structure is supported by the second movable region, and
the second connection structure is provided between the first support region and the second movable region in the second direction,
the first member further includes a first structure and a first support structure,
a first structure position of the first structure in the second direction is located between a first movable region position of the first movable region in the second direction and a first beam position of the first beam in the second direction,
a first connection structure position of the first connection structure in the second direction is located between the first structure position and the first beam position,
a first support structure position in the second direction of the first support structure is located between the first structure position and a first support region position in the second direction of the first support region,
the first structure includes a first portion, a first other portion, and a first intermediate portion,
a direction from the first portion to the first other portion is along the third direction, the first intermediate portion is provided between the first portion and the first other portion, the first portion is connected to the first connection structure, the first other portion is connected to the first movable region, the first intermediate portion is connected to the first support structure, the first member includes a first counter beam, a second counter beam, a first counter beam electrode, and a second counter beam electrode, the first counter beam and the second counter beam extend in the second direction, the first counter beam includes a first counter end and a first counter other end, the first counter end is connected to the first connecting structure, and the first counter other end is connected to the first supporting region, the second counter beam includes a second counter end and a second counter end, the second counter end is connected to the second connecting structure, and the second counter end is connected to the first supporting region, the first counter beam electrode is connected to the first counter beam, in the third direction, the first counter beam is provided between the first counter beam electrode and the first beam electrode, in the third direction, the first beam is provided between the first counter beam and the first beam electrode, the second counter beam electrode is connected to the second counter beam, in the third direction, the second counter beam is provided between the second counter beam electrode and the second beam electrode, in the third direction, the second beam is provided between the second counter beam and the second beam electrode, the first counter beam electrode has a first counter mass, a first counter thickness along the first direction, and a first counter layer configuration, the first counter beam electrode includes a first counter material and a plurality of first counter holes each having a first counter size and a first counter shape, the first counter holes have a first counter density and a first counter number, the second counter beam electrode has a second counter mass, a second counter thickness along the first direction, and a second counter layer configuration, the second counter beam electrode includes a second counter material and a plurality of second counter holes each having a second counter size and a second counter shape, the second counter holes have a second counter density and a second counter number, the first counter beam electrode and the second counter beam electrode are configured to satisfy at least one of a ninth condition, a tenth condition, an eleventh condition, a twelfth condition, a thirteenth condition, a fourteenth condition, a fifteenth condition or a sixteenth condition, in the ninth condition, the second counter mass of the second counter beam electrode is different from the first counter mass of the first counter beam electrode, in the tenth condition, the second counter thickness along the first direction of the second counter beam electrode is different from the first counter thickness along the first direction of the first counter beam electrode, in the eleventh condition, at least a part of the second counter material included in the second counter beam electrode is different from at least a part of the first counter material included in the first counter beam electrode, in the twelfth condition, the second counter size of the second counter holes included in the second counter beam electrode is different from the first counter size of the first counter holes included in the first counter beam electrode, in the thirteenth condition, the second counter density of the second counter hole is different from the first counter density of the first counter hole, in the fourteenth condition, the second counter number of the second counter holes is different from the first counter number of the first counter holes, in the fifteenth condition, the second counter shape of the second counter hole is different from the first counter shape of the first counter hole, and in the sixteenth condition, the second counter layer configuration of the second counter beam electrode is different from the first counter layer configuration of the first counter beam electrode.

10. A sensor, comprising:

a base;

a first support portion fixed to the base;

a second support portion fixed to the base;

a third support portion fixed to the base; and a first member supported by the first support portion, the second support portion and the third support portion, a gap being provided between the base and the first member, the first member including a first beam, a second beam, a first beam electrode, and a second beam electrode, the first beam and the second beam extending along a second direction crossing a first direction from the base to the first support portion, the first support portion being between the second support portion and the third support portion in the second direction, the first beam being supported by the second support portion and the first support portion, the second beam being supported by the first support portion and the third support portion, the first beam electrode being connected to the first beam, a direction from the first beam to the first beam electrode being a third direction crossing a plane including the first direction and the second direction, the second beam electrode being connected to the second beam, a direction from the second beam to the second beam electrode being along the third direction, the first beam electrode having a first mass, a first thickness along the first direction, and a first layer configuration, the first beam electrode including a first material and a plurality of first holes each having a first size, the first holes in the first beam having a first density, a first number, and a first shape, the second beam electrode having a second mass, a second thickness along the first direction, and a second layer configuration, the second beam electrode including a second material and a plurality of second holes each having a second size, the second holes in the second beam having a second density, a second number, and a second shape, the first beam electrode and the second beam electrode are configured to satisfy at least one of a first condition, a second condition, a third condition, a fourth condition, a fifth condition, a sixth condition, a seventh condition or an eighth condition, in the first condition, the second mass of the second beam electrode being different from the first mass of the first beam electrode, in the second condition, the second thickness of the second beam electrode along the first direction being different from the first thickness of the first beam electrode along the first direction, in the third condition, at least a part of the second material included in the second beam electrode being different from at least a part of the first material included in the first beam electrode, in the fourth condition, the second size of the second holes included in the second beam electrode being different from the first size of the first holes included in the first beam electrode, in the fifth condition, the second density of the second holes being different from the first density of the first holes, in the sixth condition, the second number of the second holes being different from the first number of the first holes, in the seventh condition, the second shape of the second hole being different from the first shape of the first hole, and in the eighth condition, the second layer configuration of the second beam electrode being different from the first layer configuration of the first beam electrode.

11. The sensor according to claim 10, wherein
the first member further includes a first support region, a second support region, a third support region, a first movable region, a second movable region, a first connection structure, and a second connection structure,
the first support portion is provided between the base and the first support region in the first direction,
the second support portion is provided between the base and the second support region in the first direction,
the third support portion is provided between the base and the third support region in the first direction,
the first support region is supported by the first support portion,
the second support region is supported by the second support portion,
the third support region is supported by the third support portion,
in the second direction, the second support region is provided between the first movable region and the first beam,
in the second direction, the first support region is provided between the first beam and the second beam,
in the second direction, the third support region is provided between the second beam and the second movable region,
the first connection structure is supported by the second support region,
the first beam is supported by the first connection structure and the first support region, the second connection structure is supported by the third support region, and
the second beam is supported by the first support region and the second connection structure.

12. The sensor according to claim 11, further comprising:
a first electrode fixed to the base; and
a first counter electrode fixed to the base,
the first member further including a first counter beam electrode connected to the first beam, and
in the third direction, the first beam being provided between the first counter beam electrode and the first beam electrode,
the first electrode facing the first beam electrode, and
the first counter electrode facing the first counter beam electrode.

13. The sensor according to claim 12, further comprising:
a controller,
the controller being configured to apply a drive signal including an AC component between the first electrode and the first beam electrode, and
the controller being configured to detect an electrical signal generated between the first counter electrode and the first counter beam electrode.

14. The sensor according to claim 11, wherein
the first member includes a first counter beam electrode and a second counter beam electrode,
the first counter beam electrode is connected to the first beam,
in the third direction, the first beam is provided between the first counter beam electrode and the first beam electrode,
the second counter beam electrode is connected to the second beam,
in the third direction, the second beam is provided between the second counter beam electrode and the second beam electrode,
the first counter beam electrode has a first counter mass, a first counter thickness along the first direction, and a first counter layer configuration,
the first counter beam electrode includes a first counter material and a plurality of first counter holes each having a first counter size and a first counter shape,
the first counter holes have a first counter density and a first counter number,
the second counter beam electrode has a second counter mass, a second counter thickness along the first direction, and a second counter layer configuration,
the second counter beam electrode includes a second counter material and a plurality of second counter holes each having a second counter size and a second counter shape,
the second counter holes have a second counter density and a second counter number,
the first counter beam electrode and the second counter beam electrode are configured to satisfy at least one of a ninth condition, a tenth condition, an eleventh condition, a twelfth condition, a thirteenth condition, a fourteenth condition, a fifteenth condition or a sixteenth condition,
in the ninth condition, the second counter mass of the second counter beam electrode is different from the first counter mass of the first counter beam electrode,
in the tenth condition, the second counter thickness of the second counter beam electrode along the first direction is different from the first counter thickness of the first counter beam electrode along the first direction, in the eleventh condition, at least a part of the second counter material included in the second facing beam electrode is different from at least a part of the first counter material included in the first facing beam electrode, in the twelfth condition, the second counter size of the second counter holes included in the second counter beam electrode is different from the first counter size of the first counter holes included in the first counter beam electrode, in the thirteenth condition, the second counter density of the second counter holes is different from the first counter density of the first counter holes, in the fourteenth condition, the second counter number of the second counter holes is different from the first counter number of the first counter holes, in the fifteenth condition, the second counter shape of the second counter holes is different from the first counter shape of the first counter holes, and in the sixteenth condition, the second counter layer configuration of the second counter beam electrode is different from the first counter layer configuration of the first counter beam electrode.

15. The sensor according to claim 14, wherein
the first member further includes a third movable region and a first structure,
the first beam electrode is provided between the first beam and the third movable region in the third direction,
the first structure includes a first portion, a first other portion and a first intermediate portion,
a direction from the first portion to the first other portion is along the third direction,
the first intermediate portion is provided between the first portion and the first other portion,
the first portion is connected to the first connection structure,
the first other portion is connected to the third movable region,
the first intermediate portion is connected to the third support region,
the first member further includes a third structure,
the third structure includes a third portion, a third other portion and a third intermediate portion,
a direction from the third portion to the third other portion is along the third direction,
the third intermediate portion is provided between the third portion and the third other portion,
the third portion is connected to the second connection structure,
the third other portion is connected to the third movable region,
the third intermediate portion is connected to the third support region,
the first member further includes a fourth movable region and a second structure,
the first counter beam electrode is provided between the fourth movable region and the first beam in the third direction,
the second structure includes a second portion, a second other portion and a second intermediate portion;
a direction from the second other portion to the second portion is along the third direction,
the second intermediate portion is provided between the second other portion and the second portion,
the second portion is connected to the first connection structure,
the second other portion is connected to the fourth movable region,
the second intermediate portion is connected to the second support region,
the first member further includes a fourth structure,
the fourth structure includes a fourth portion, a fourth other portion and a fourth intermediate portion,
a direction from the fourth other portion to the fourth portion is along the third direction,
the fourth intermediate portion is provided between the fourth other portion and the fourth portion,
the fourth portion is connected to the second connection structure,
the fourth other portion is connected to the fourth movable region, and
the fourth intermediate portion is connected to the third support region.

16. The sensor according to claim 15, wherein
the first member further includes a first support structure, a second support structure, a third support structure and a fourth support structure,
the first support structure and the second support structure are connected to the second support region,
the second support region is provided between the first support structure and the second support structure in the third direction,
the first movable region is supported by the first support structure and the second support structure,
the third support structure and the fourth support structure are connected to the third support region,
the third support region is provided between the third support structure and the fourth support structure in the third direction, and
the second movable region is supported by the third support structure and the fourth support structure.

17. The sensor according to claim 10, wherein
the first member further includes a first counter beam, a second counter beam, a first counter beam electrode and a second counter beam electrode,
the first counter beam and the second counter beam extend along the second direction,
the first counter beam is supported by the second support portion and the first support portion,
the second counter beam is supported by the first support portion and the third support portion,
the first counter beam electrode is connected to the first counter beam,
a direction from the first counter beam electrode to the first counter beam is along the third direction,
the second counter beam electrode is connected to the second counter beam, and
a direction from the second counter beam electrode to the second counter beam is along the third direction.

* * * * *